United States Patent
Seshadri

(10) Patent No.: US 11,481,645 B2
(45) Date of Patent: Oct. 25, 2022

(54) SYSTEM, METHOD, AND COMPUTER PROGRAM PRODUCT FOR GENERATING REAL-TIME PREDICTIONS FOR VEHICLE TRANSPORTATION REQUESTS USING MACHINE LEARNING

(71) Applicant: Visa International Service Association, San Francisco, CA (US)

(72) Inventor: Madhavan Seshadri, Singapore (SG)

(73) Assignee: Visa International Service Association, San Francisco, CA (US)

( * ) Notice: Subject to any disclaimer, the term of this patent is extended or adjusted under 35 U.S.C. 154(b) by 1087 days.

(21) Appl. No.: 16/120,789

(22) Filed: Sep. 4, 2018

(65) Prior Publication Data
US 2020/0074320 A1    Mar. 5, 2020

(51) Int. Cl.
*G06N 5/04* (2006.01)
*G08G 1/00* (2006.01)
*G06N 20/00* (2019.01)

(52) U.S. Cl.
CPC .............. *G06N 5/04* (2013.01); *G06N 20/00* (2019.01); *G08G 1/202* (2013.01); *G06Q 2240/00* (2013.01)

(58) Field of Classification Search
CPC ........... G06N 5/04; G06N 20/00; G08G 1/202
USPC .......................................................... 706/11
See application file for complete search history.

(56) References Cited

U.S. PATENT DOCUMENTS

| | | | |
|---|---|---|---|
| 9,432,929 B1* | 8/2016 | Ross | H04W 48/20 |
| 9,792,575 B2* | 10/2017 | Khasis | G08G 1/0112 |
| 9,965,960 B1* | 5/2018 | McDavitt-Van Fleet | H04W 4/023 |
| 2013/0226655 A1* | 8/2013 | Shaw | G06F 30/20 705/7.29 |
| 2017/0123421 A1* | 5/2017 | Kentley | G06Q 10/00 |
| 2017/0124489 A1* | 5/2017 | Leavitt | G06Q 10/02 |
| 2018/0032920 A1* | 2/2018 | Ito | G06Q 10/02 |
| 2018/0108103 A1* | 4/2018 | Li | G06Q 20/0855 |
| 2018/0156625 A1* | 6/2018 | Mangal | G08G 1/202 |

(Continued)

FOREIGN PATENT DOCUMENTS

WO    2016025291 A1    2/2016

*Primary Examiner* — Kerri L McNally
(74) *Attorney, Agent, or Firm* — The Webb Law Firm

(57) ABSTRACT

Described are a system, method, and computer program product for generating real-time predictions for vehicle transportation requests using machine learning. The method includes generating, with a processor and a machine-learning classification model, a transportation categorization for each consumer of a plurality of consumers based on historic transaction data; processing a plurality of new transactions by each consumer, each new transaction associated with a geographic node of activity; in response to processing the new transactions, generating a plurality of vehicle transportation predictions for the consumers based on the transportation categorization for each consumer and a geographic node of activity associated with a new transaction, each vehicle transportation prediction representing a likelihood that the consumer will request vehicle transportation subsequent to conducting the new transaction; and generating a supply map interface comprising a visual identification of a location in which a number of requests for vehicle transportation is predicted to increase based on the vehicle transportation predictions.

20 Claims, 11 Drawing Sheets

(56) References Cited

U.S. PATENT DOCUMENTS

| | | | |
|---|---|---|---|
| 2018/0157669 A1* | 6/2018 | Naghdy | G06Q 30/02 |
| 2018/0157984 A1* | 6/2018 | O'Herlihy | G06N 5/02 |
| 2018/0188052 A1* | 7/2018 | Singh | G01C 21/3476 |
| 2018/0276695 A1* | 9/2018 | Dione | G06N 20/10 |

* cited by examiner

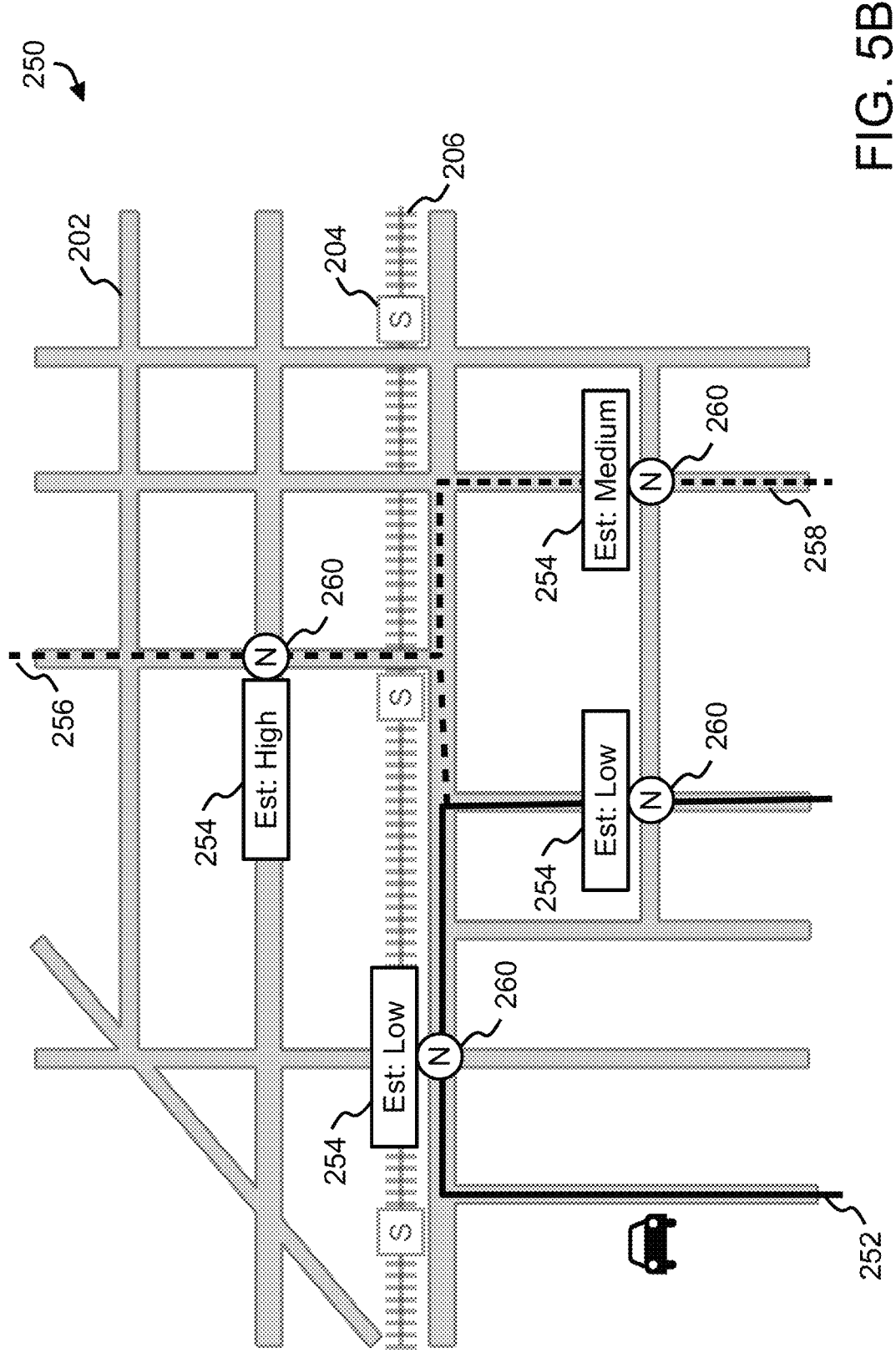

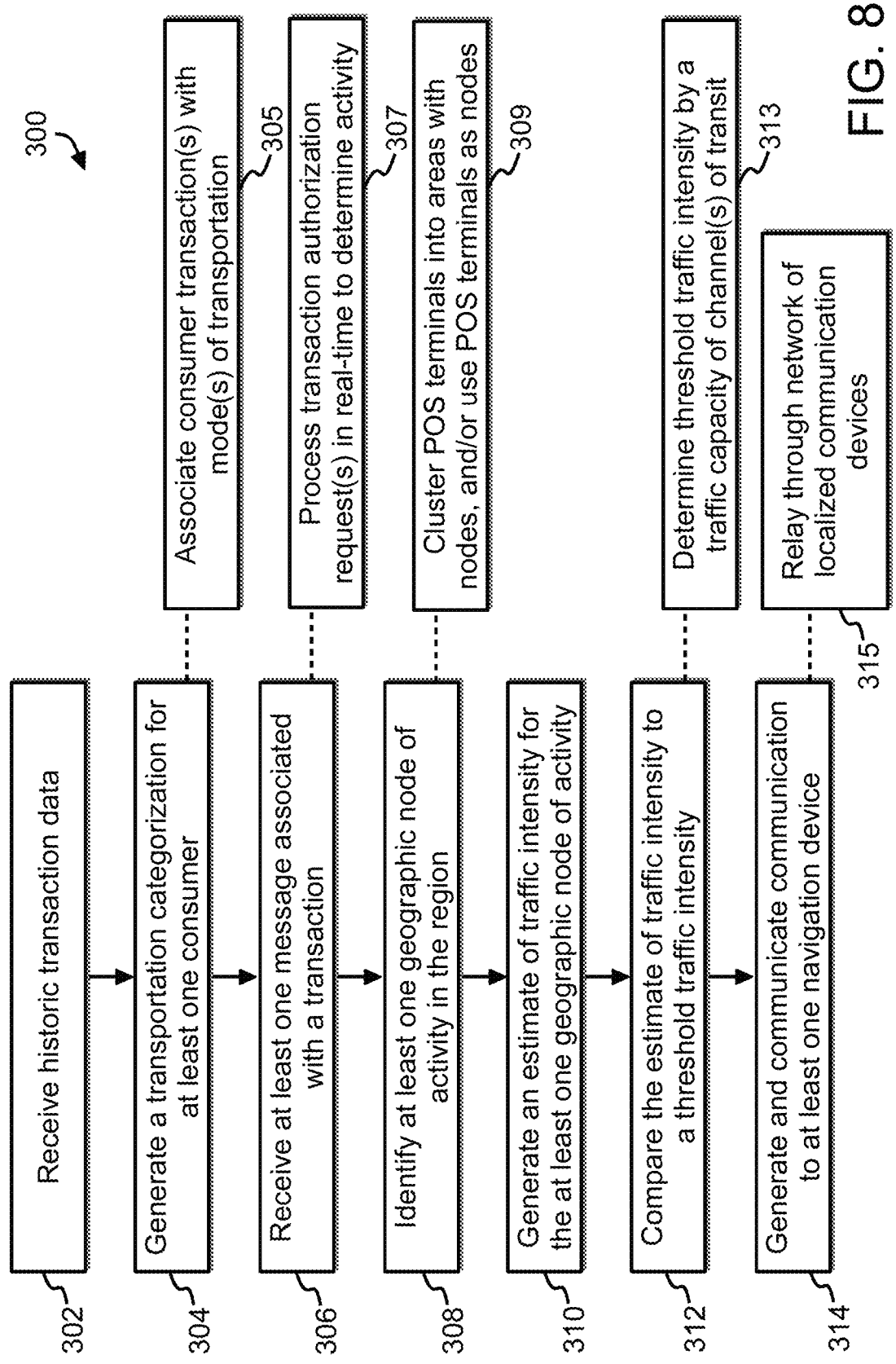

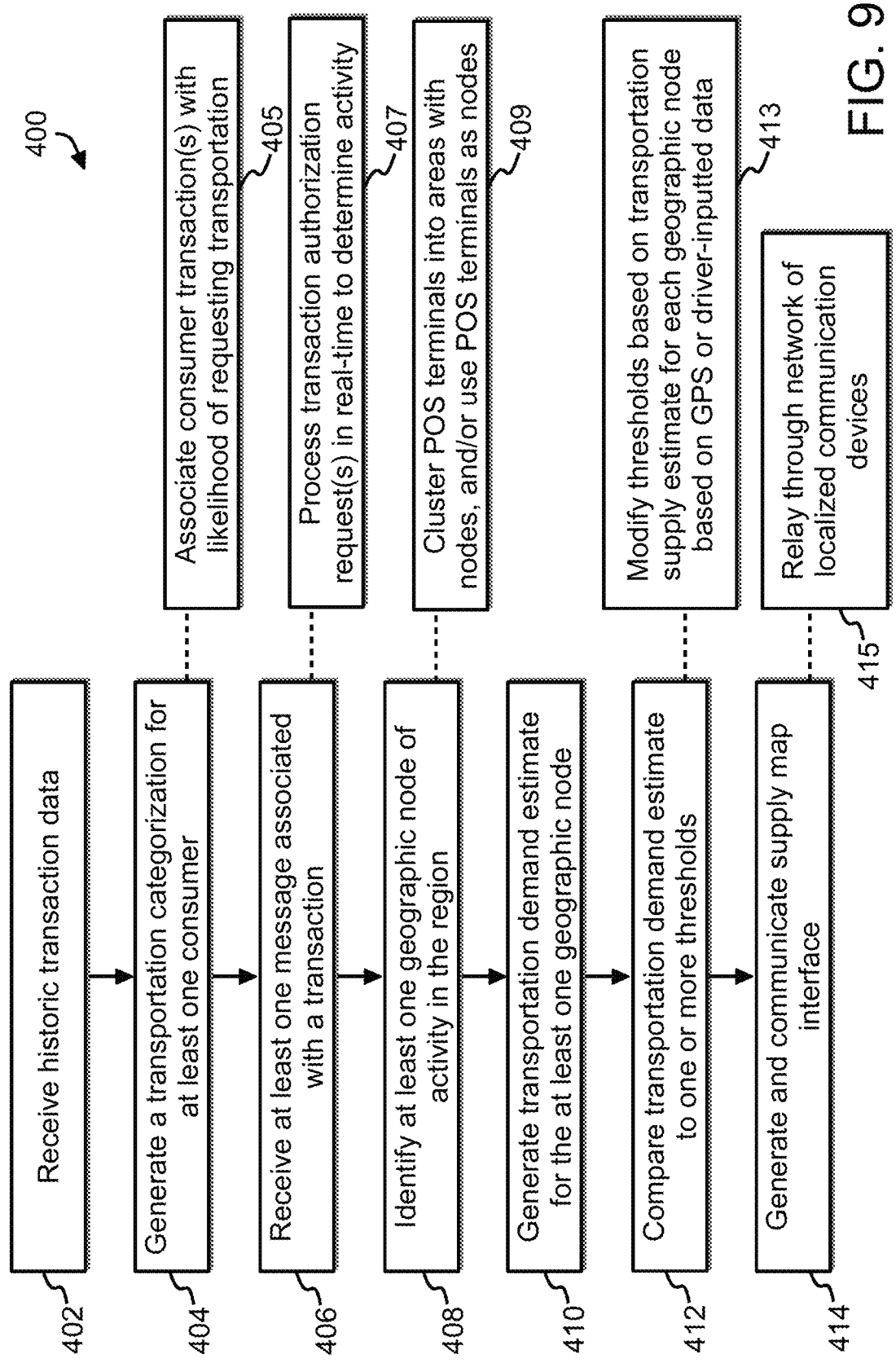

SYSTEM, METHOD, AND COMPUTER PROGRAM PRODUCT FOR GENERATING REAL-TIME PREDICTIONS FOR VEHICLE TRANSPORTATION REQUESTS USING MACHINE LEARNING

BACKGROUND

Field

Disclosed embodiments relate generally to computer-implemented predictions for vehicle transportation requests, and in some non-limiting embodiments or aspects, to a system, method, and computer program product for generating real-time predictions for vehicle transportation requests using machine learning.

Technical Considerations

Traffic congestion is a common problem with serious economic and environmental implications. Every year, travelers around the world cumulatively spend billions of hours stuck in traffic—time that could otherwise be used productively. Moreover, as vehicles spend more time on the road due to traffic, more energy is consumed to power those vehicles, and more vehicle emissions are produced. Such traffic problems are not limited to roadway drivers, either, and the traffic problems affect several networks, including transport by train, bus, ferry, taxi, and other modes of transportation. Existing traffic-avoidance solutions are usually focused on identifying traffic already in progress and optimizing a route based on known traffic conditions. For example, traffic may be self-reported, by other travelers in a network, or deduced based on geo-tracking travelers in real-time. Such solutions, however, are generally reactionary (not predictive), and the solutions are largely unable to re-route the first to arrive at a traffic event. More predictive traffic-avoidance systems may take into account the regular ebbs and flows of traffic that occur at certain times of day or days of the week, but those systems may not predict irregular, unscheduled, and/or non-seasonal changes in traffic.

There is a need in the art for predictive traffic avoidance systems that can anticipate changes in traffic based on additional factors beyond current or historical traffic conditions. There is a need in the art for such systems to predict traffic changes substantially in real-time and to communicate route changes to navigational systems in the region in advance of predicted traffic events.

In addition, in recent years, consumers have become increasingly reliant on vehicles-for-hire as opposed to personal vehicles for a number of reasons, including improvements in ride-hailing technology and increased concentrations of populations in urban centers. Expanded utilization of vehicles-for-hire produces a number of societal benefits, such as reducing the total number of vehicles on increasingly crowded streets and allowing space that otherwise would be occupied by parked vehicles to be used for other purposes. However, reliance on vehicles-for-hire can often cost consumers valuable time due to the intrinsic delays that are encountered when attempting to locate and engage a vehicle-for-hire in person or due to the time that is required for a vehicle-for-hire that has been requested electronically (e.g., via a telephone call or through a mobile application) to be dispatched and sent to the correct location to pick up the consumer. Further, for operators of vehicles-for-hire, valuable time often may be wasted when attempting to locate potential customers in person or when the vehicle is traveling from a dispatch location to the location of a customer who has requested transportation electronically.

Existing systems that attempt to address these issues generally rely on both the potential customer and vehicle operator using a dedicated computer program, such as a mobile application, and a vehicle operator generally determines the locations of potential customers based on data received from devices associated with the potential customers (e.g., GPS data and/or user-input location data). However, such systems have several technical limitations. For example, such systems generally cannot determine the locations of potential customers who are not actively using a dedicated computer program, and are accordingly of no use for engaging customers in-person. Further, such systems are reactive, rather than predictive, such that a location of a potential customer is not determined until the potential customer is already seeking a ride. Accordingly, surges in demand at certain locations (e.g., due to an event that the vehicle-for-hire operator may not be aware of) are not accounted for until many customers have already transmitted ride requests, and this can lead to increased wait time for potential customers and wasted time and/or lost business opportunities for operators of vehicles-for-hire.

There is a need in the art for predictive systems for allowing an operator of a vehicle-for-hire to identify optimal locations for engaging new customers that can anticipate changes in demand based on additional factors beyond current or historical conditions. There is a need in the art for such systems to predict changes in demand for vehicles-for-hire substantially in real-time and to communicate route changes to navigational systems associated with such vehicles in the region in advance of predicted instances of increased demand.

SUMMARY

Accordingly, and generally, provided is an improved system, computer-implemented method, and computer program product for machine-learning-based traffic prediction. Preferably, provided is a system, computer-implemented method, and computer program product for receiving historic transaction data including a plurality of transactions and generating, using a machine-learning classification model, a transportation categorization for at least one consumer. Preferably, provided is a system, computer-implemented method, and computer program product for receiving at least one message associated with at least one transaction, identifying at least one geographic node of activity in the region, and generating an estimate of traffic intensity for the at least one geographic node of activity. Preferably, provided is a system, computer-implemented method, and computer program product for comparing the estimate of traffic intensity to a threshold of traffic intensity and, in response to determining that the estimate of traffic intensity satisfies the threshold: generating a communication configured to cause at least one navigation device to modify a navigation route; and communicating the communication to the at least one navigation device.

Additionally, and generally, provided is an improved system, computer-implemented method, and computer program product for generating real-time predictions for vehicle transportation requests using machine learning. Preferably, provided is a system, computer-implemented method, and computer program product for generating, with at least one processor and a machine-learning classification model, a transportation categorization for each consumer of a plurality of consumers based at least partially on historic transaction data including a plurality of transactions by each of the plurality of consumers, each plurality of transactions for each consumer including a subset of transactions for vehicle transportation. Preferably, provided is a system, computer-implemented method, and computer program product for processing, with at least one processor, a plurality of new transactions by each consumer of the plurality of consumers, each new transaction of the plurality of new transactions associated with at least one geographic node of activity. Preferably, provided is a system, computer-implemented method, and computer program product for generating, with at least one processor and the machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction. Preferably, provided is a system, computer-implemented method, and computer program product for generating, with at least one processor, a supply map interface including at least one visual identification of at least one location in which a number of requests for vehicle transportation is predicted to increase based on the plurality of vehicle transportation predictions.

According to one non-limiting embodiment or aspect, provided is a computer-implemented method for machine-learning-based traffic prediction. The method includes receiving, with at least one processor, historic transaction data including a plurality of transactions by at least one consumer. The method also includes generating, with at least one processor and using a machine-learning classification model, based at least partially on the historic transaction data, a transportation categorization for the at least one consumer representative of a mode of transportation to be taken by the at least one consumer when the at least one consumer travels to complete a transaction at a point-of-sale terminal. The method further includes receiving, with at least one processor, at least one message associated with at least one transaction between the at least one consumer and at least one point-of-sale terminal in a region. The method further includes identifying, with at least one processor, at least one geographic node of activity in the region including the at least one point-of-sale terminal. The method further includes generating, with at least one processor and based at least partially on the at least one message and the transportation categorization of the at least one consumer, an estimate of traffic intensity for the at least one geographic node of activity. The estimate of traffic intensity is representative of a predicted volume of traffic for a mode of transportation. The method further includes comparing, with at least one processor, the estimate of traffic intensity for the at least one geographic node of activity to a threshold of traffic intensity for the at least one geographic node of activity. The method further includes, in response to determining that the estimate of traffic intensity for the at least one geographic node of activity satisfies the threshold: generating, with at least one processor, a communication to at least one navigation device configured to cause the at least one navigation device to modify a navigation route; and communicating, with at least one processor, the communication to the at least one navigation device.

In further non-limiting embodiments or aspects, the generating of the transportation categorization may include associating at least one type of transaction with at least one mode of transportation. The at least one mode of transportation may include at least transit by motor vehicle, and the at least one type of transaction may include at least one of: gasoline purchase, toll road payment, vehicle purchase or lease payment, vehicle repair service, vehicle maintenance service, or any combination thereof.

In further non-limiting embodiments or aspects, the at least one point-of-sale terminal may include a plurality of point-of-sale terminals, the at least one geographic node of activity may include a plurality of geographic nodes of activity, and each geographic node of activity of the plurality of geographic nodes of activity may include a subset of point-of-sale terminals of the plurality of point-of-sale terminals. The region may include at least one channel of transit by which a traveler is able to travel to a point-of-sale terminal of the at least one geographic node of activity, and the threshold of traffic intensity may be predetermined and based at least partially on a capacity of traffic of the at least one channel of transit. The at least one channel of transit may include a plurality of roads, and the capacity of traffic may be based at least partially on a volume of vehicular traffic capable of traveling along the plurality of roads.

In further non-limiting embodiments or aspects, the communication to the at least one navigation device may be relayed through at least one localized communication device positioned in a subregion of the region. The at least one localized communication device may be programmed and/or configured to communicate with navigation devices in the subregion to facilitate generation of navigation routes for travelers in the subregion. The at least one localized communication device may include a plurality of localized communication devices forming a subregional communication network. Each localized communication device of the plurality of localized communication devices may be programmed and/or configured to communicate with navigation devices and other localized communication devices to facilitate generation of navigation routes for travelers in the subregion.

In further non-limiting embodiments or aspects, the method may include associating, with at least one processor, the at least one geographic node of activity with a category of traffic intensity. The method may also include generating, with at least one processor, display data configured to cause the at least one navigation device to display the at least one geographic node of activity as at least one point on a geographical map of the region. A visual characteristic of the at least one point may represent the category of traffic intensity. The at least one message may include a plurality of transaction authorization requests in an electronic payment processing network occurring in real-time. The at least one navigation device may be associated with at least one consumer who is traveling through the region via the navigation route.

According to one non-limiting embodiment or aspect, provided is a system for machine-learning-based traffic prediction. The system includes at least one server computer including at least one processor. The at least one server computer is programmed and/or configured to receive historic transaction data including a plurality of transactions by at least one consumer. The at least one server computer is also programmed and/or configured to generate, using a machine-learning classification model and based at least partially on the historic transaction data, a transportation categorization for the at least one consumer representative of a mode of transportation to be taken by the at least one consumer when the at least one consumer travels to complete a transaction at a point-of-sale terminal. The at least one server computer is further programmed and/or configured to receive at least one message associated with at least one transaction between the at least one consumer and at least one point-of-sale terminal in a region. The at least one server computer is further programmed and/or configured to identify at least one geographic node of activity in the region including the at least one point-of-sale terminal. The at least one server computer is further programmed and/or configured to generate, based at least partially on the at least one message and the transportation categorization of the at least one consumer, an estimate of traffic intensity for the at least one geographic node of activity, the estimate of traffic intensity representative of a predicted volume of traffic for a mode of transportation. The at least one server computer is further programmed and/or configured to compare the estimate of traffic intensity for the at least one geographic node of activity to a threshold of traffic intensity for the at least one geographic node of activity. The at least one server computer is further programmed and/or configured to, in response to determining that the estimate of traffic intensity for the at least one geographic node of activity satisfies the threshold: generate a communication to at least one navigation device configured to cause the at least one navigation device to modify a navigation route; and communicate the communication to the at least one navigation device.

In further non-limiting embodiments or aspects, the generating of the transportation categorization may include associating at least one type of transaction with at least one mode of transportation. The at least one mode of transportation may include at least transit by motor vehicle and the at least one type of transaction may include at least one of: gasoline purchase, toll road payment, vehicle purchase or lease payment, vehicle repair service, vehicle maintenance service, or any combination thereof.

In further non-limiting embodiments or aspects, the at least one point-of-sale terminal may include a plurality of point-of-sale terminals, the at least one geographic node of activity may include a plurality of geographic nodes of activity, and each geographic node of activity of the plurality of geographic nodes of activity may include a subset of point-of-sale terminals of the plurality of point-of-sale terminals. The region may include at least one channel of transit by which a traveler is able to travel to a point-of-sale terminal of the at least one geographic node of activity. The threshold of traffic intensity may be predetermined and based at least partially on a capacity of traffic of the at least one channel of transit. The at least one channel of transit may include a plurality of roads, and the capacity of traffic may be based at least partially on a volume of vehicular traffic capable of traveling along the plurality of roads.

In further non-limiting embodiments or aspects, the communication to the at least one navigation device may be relayed through at least one localized communication device positioned in a subregion of the region. The at least one localized communication device may be programmed and/or configured to communicate with navigation devices in the subregion to facilitate generation of navigation routes for travelers in the subregion. The at least one localized communication device may include a plurality of localized communication devices forming a subregional communication network, and each localized communication device of the plurality of localized communication devices may be programmed and/or configured to communicate with navigation devices and other localized communication devices to facilitate generation of navigation routes for travelers in the subregion.

In further non-limiting embodiments or aspects, the at least one server computer may be programmed and/or configured to associate the at least one geographic node of activity with a category of traffic intensity. The at least one server computer may also be programmed and/or configured to generate display data configured to cause the at least one navigation device to display the at least one geographic node of activity as at least one point on a geographical map of the region. A visual characteristic of the at least one point may represent the category of traffic intensity. The at least one message may include a plurality of transaction authorization requests in an electronic payment processing network occurring in real-time. The at least one navigation device may be associated with at least one consumer who is traveling through the region via the navigation route.

According to one non-limiting embodiment or aspect, provided is a computer program product for machine-learning-based traffic prediction. The computer program product includes at least one non-transitory computer-readable medium including program instructions that, when executed by at least one processor, cause the at least one processor to receive historic transaction data including a plurality of transactions by at least one consumer. The program instructions also cause the at least one processor to generate, using a machine-learning classification model and based at least partially on the historic transaction data, a transportation categorization for the at least one consumer representative of a mode of transportation to be taken by the at least one consumer when the at least one consumer travels to complete a transaction at a point-of-sale terminal. The program instructions further cause the at least one processor to receive at least one message associated with at least one transaction between the at least one consumer and at least one point-of-sale terminal in a region. The program instructions further cause the at least one processor to identify at least one geographic node of activity in the region including the at least one point-of-sale terminal. The program instructions further cause the at least one processor to generate, based at least partially on the at least one message and the transportation categorization of the at least one consumer, an estimate of traffic intensity for the at least one geographic node of activity. The estimate of traffic intensity is representative of a predicted volume of traffic for a mode of transportation. The program instructions further cause the at least one processor to compare the estimate of traffic intensity for the at least one geographic node of activity to a threshold of traffic intensity for the at least one geographic node of activity. The program instructions further cause the at least one processor to, in response to determining that the estimate of traffic intensity for the at least one geographic node of activity satisfies the threshold: generate a communication to at least one navigation device configured to cause the at least one navigation device to modify a navigation route; and communicate the communication to the at least one navigation device.

In further non-limiting embodiments or aspects, the generating of the transportation categorization may include associating at least one type of transaction with at least one mode of transportation. The at least one mode of transportation may include at least transit by motor vehicle, and the at least one type of transaction may include at least one of: gasoline purchase, toll road payment, vehicle purchase or lease payment, vehicle repair service, vehicle maintenance service, or any combination thereof.

In further non-limiting embodiments or aspects, the at least one point-of-sale terminal may include a plurality of point-of-sale terminals, the at least one geographic node of activity may include a plurality of geographic nodes of activity, and each geographic node of activity of the plurality of geographic nodes of activity may include a subset of point-of-sale terminals of the plurality of point-of-sale terminals. The region may include at least one channel of transit by which a traveler is able to travel to a point-of-sale terminal of the at least one geographic node of activity. The threshold of traffic intensity may be predetermined and based at least partially on a capacity of traffic of the at least one channel of transit. The at least one channel of transit may include a plurality of roads, and the capacity of traffic may be based at least partially on a volume of vehicular traffic capable of traveling along the plurality of roads.

In further non-limiting embodiments or aspects, the communication to the at least one navigation device may be relayed through at least one localized communication device positioned in a subregion of the region. The at least one localized communication device may be programmed and/or configured to communicate with navigation devices in the subregion to facilitate generation of navigation routes for travelers in the subregion. The at least one localized communication device may include a plurality of localized communication devices forming a subregional communication network. Each localized communication device of the plurality of localized communication devices may be programmed and/or configured to communicate with navigation devices and other localized communication devices to facilitate generation of navigation routes for travelers in the subregion.

In further non-limiting embodiments or aspects, the program instructions may cause the at least one processor to associate the at least one geographic node of activity with a category of traffic intensity. The program instructions may also cause the at least one processor to generate display data configured to cause the at least one navigation device to display the at least one geographic node of activity as at least one point on a geographical map of the region. A visual characteristic of the at least one point may represent the category of traffic intensity. The at least one message may include a plurality of transaction authorization requests in an electronic payment processing network occurring in real-time. The at least one navigation device may be associated with at least one consumer who is traveling through the region via the navigation route.

Additionally, generally provides is an improved system, computer-implemented method, and computer program product for a system, method, and computer program product for generating real-time predictions for vehicle transportation requests using machine learning.

According to one non-limiting embodiment or aspect, provided is a computer-implemented method for generating real-time predictions for vehicle transportation requests using machine learning, including: generating, with at least one processor and a machine-learning classification model, a transportation categorization for each consumer of a plurality of consumers based at least partially on historic transaction data including a plurality of transactions by each of the plurality of consumers, each plurality of transactions for each consumer including a subset of transactions for vehicle transportation; processing, with at least one processor, a plurality of new transactions by each consumer of the plurality of consumers, each new transaction of the plurality of new transactions associated with at least one geographic node of activity; in response to processing the plurality of new transactions, generating, with at least one processor and the machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generating, with at least one processor, a supply map interface including at least one visual identification of at least one location in which a number of requests for vehicle transportation is predicted to increase based on the plurality of vehicle transportation predictions.

In further non-limiting embodiments or aspects, the transportation categorization for each consumer may be generated based at least partially on a transaction type. The transaction type may be determined based on at least one of the following: a merchant category, a merchant identity, a transaction amount, a transaction frequency, or any combination thereof. The transportation categorization for each consumer may be generated based at least partially on condition data for the plurality of transactions, the condition data including at least one of the following: a time of day, a day of the week, a day of the year, a weather condition, a proximity to a specified location, a proximity to a specified event, or any combination thereof.

In further non-limiting embodiments or aspects, the method may further include automatically dispatching, with at least one processor, at least one vehicle to the at least one location. The geographic node of activity may correspond to a location of at least one point-of-sale terminal.

In further non-limiting embodiments or aspects, the method may further include receiving, by at least one processor, location data associated with a geographic location of at least one vehicle-for-hire; and associating, by at least one processor, the geographic location of the at least one vehicle-for-hire with at least one geographic node of activity based on a proximity of the vehicle-for-hire to the at least one geographic node of activity, wherein the at least one visual identification of the at least one location in which a number of requests for vehicle transportation is predicted to increase is further generated based on a number of vehicles-for-hire that is associated with the at least one geographic node of activity corresponding to the at least one location.

According to one non-limiting embodiment or aspect, provided is a system for generating real-time predictions for vehicle transportation requests using machine learning, including at least one processor programmed and/or configured to: generate, with a machine-learning classification model, a transportation categorization for each consumer of a plurality of consumers based at least partially on historic transaction data including a plurality of transactions by each of the plurality of consumers, each plurality of transactions for each consumer including a subset of transactions for vehicle transportation; process a plurality of new transactions by each consumer of the plurality of consumers, each new transaction of the plurality of new transactions associated with at least one geographic node of activity; in response to processing the plurality of new transactions, generate, with machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generate a supply map interface including at least one visual identification of at least one location in which a number of requests for vehicle transportation is predicted to increase based on the plurality of vehicle transportation predictions.

In further non-limiting embodiments or aspects, the at least one processor may be programmed and/or configured to generate the transportation categorization for each consumer based at least partially on a transaction type. The at least one processor may be programmed and/or configured to determine the transaction type based on at least one of the following: a merchant category, a merchant identity, a transaction amount, a transaction frequency, or any combination thereof.

In further non-limiting embodiments or aspects, the at least one processor may be programmed and/or configured to generate the transportation categorization for each consumer is based at least partially on condition data for the plurality of transactions, the condition data including at least one of the following: a time of day, a day of the week, a day of the year, a weather condition, a proximity to a specified location, a proximity to a specified event, or any combination thereof.

In further non-limiting embodiments or aspects, the at least one processor may be further programmed and/or configured to automatically dispatch at least one vehicle to the at least one location. The geographic node of activity may correspond to a location of at least one point-of-sale terminal.

In further non-limiting embodiments or aspects, the at least processor may be further programmed and/or configured to: receive location data associated with a geographic location of at least one vehicle-for-hire; and associate the geographic location of the at least one vehicle-for-hire with at least one geographic node of activity based on a proximity of the vehicle-for-hire to the at least one geographic node of activity, wherein the at least one visual identification of the at least one location in which a number of requests for vehicle transportation is predicted to increase is further generated based on a number of vehicles-for-hire that is associated with the at least one geographic node of activity corresponding to the at least one location.

According to one non-limiting embodiment or aspect, provided is a computer program product for generating real-time predictions for vehicle transportation requests using machine learning, including instructions, which, when executed by at least one processer, cause the at least one processor to: generate, with a machine-learning classification model, a transportation categorization for each consumer of a plurality of consumers based at least partially on historic transaction data including a plurality of transactions by each of the plurality of consumers, each plurality of transactions for each consumer including a subset of transactions for vehicle transportation; process a plurality of new transactions by each consumer of the plurality of consumers, each new transaction of the plurality of new transactions associated with at least one geographic node of activity; in response to processing the plurality of new transactions, generate, with machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generate a supply map interface including at least one visual identification of at least one location in which a number of requests for vehicle transportation is predicted to increase based on the plurality of vehicle transportation predictions.

In further non-limiting embodiments or aspects, the computer program product may further include instructions, which, when executed by at least one processor, cause the at least one processor to: generate the transportation categorization for each consumer based at least partially on a transaction type, wherein the transaction type is determined based on at least one of the following: a merchant category, a merchant identity, a transaction amount, a transaction frequency, or any combination thereof.

In further non-limiting embodiments or aspects, the computer program product may further include instructions, which, when executed by at least one processer, cause the at least one processor to: generate the transportation categorization for each consumer is based at least partially on condition data for the plurality of transactions, the condition data including at least one of the following: a time of day, a day of the week, a day of the year, a weather condition, a proximity to a specified location, a proximity to a specified event, or any combination thereof.

In further non-limiting embodiments or aspects, the computer program product may further include instructions, which, when executed by at least one processer, cause the at least one processor to: to automatically dispatch at least one vehicle to the at least one location. The geographic node of activity may correspond to a location of at least one point-of-sale terminal.

In further non-limiting embodiments or aspects, the computer program product may further include instructions, which, when executed by at least one processer, cause the at least one processor to: receive location data associated with a geographic location of at least one vehicle-for-hire; and associate the geographic location of the at least one vehicle-for-hire with at least one geographic node of activity based on a proximity of the vehicle-for-hire to the at least one geographic node of activity, wherein the at least one visual identification of the at least one location in which a number of requests for vehicle transportation is predicted to increase is further generated based on a number of vehicles-for-hire that is associated with the at least one geographic node of activity corresponding to the at least one location.

Other preferred and non-limiting embodiments or aspects will be set forth in the following numbered clauses:

Clause 1: A computer-implemented method for generating real-time predictions for vehicle transportation requests using machine learning, comprising: generating, with at least one processor and a machine-learning classification model, a transportation categorization for each consumer of a plurality of consumers based at least partially on historic transaction data comprising a plurality of transactions by each of the plurality of consumers, each plurality of transactions for each consumer including a subset of transactions for vehicle transportation; processing, with at least one processor, a plurality of new transactions by each consumer of the plurality of consumers, each new transaction of the plurality of new transactions associated with at least one geographic node of activity; in response to processing the plurality of new transactions, generating, with at least one processor and the machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generating, with at least one processor, a supply map interface comprising at least one visual identification of at least one location in which a number of requests for vehicle transportation is predicted to increase based on the plurality of vehicle transportation predictions.

Clause 2: The computer-implemented method of clause 1, wherein generating the transportation categorization for each consumer is based at least partially on a transaction type.

Clause 3: The computer-implemented method of clauses 1 or 2, wherein the transaction type is determined based on at least one of the following: a merchant category, a merchant identity, a transaction amount, a transaction frequency, or any combination thereof.

Clause 4: The computer-implemented method of any of clauses 1-3, wherein generating the transportation categorization for each consumer is based at least partially on condition data for the plurality of transactions, the condition data comprising at least one of the following: a time of day, a day of the week, a day of the year, a weather condition, a proximity to a specified location, a proximity to a specified event, or any combination thereof.

Clause 5: The computer-implemented method of any of clauses 1-4, further comprising automatically dispatching, with at least one processor, at least one vehicle to the at least one location.

Clause 6: The computer-implemented method of any of clauses 1-5, wherein the geographic node of activity corresponds to a location of at least one point-of-sale terminal.

Clause 7: The computer-implemented method of any of clauses 1-6, further comprising: receiving, by at least one processor, location data associated with a geographic location of at least one vehicle-for-hire; and associating, by at least one processor, the geographic location of the at least one vehicle-for-hire with at least one geographic node of activity based on a proximity of the vehicle-for-hire to the at least one geographic node of activity, wherein the at least one visual identification of the at least one location in which a number of requests for vehicle transportation is predicted to increase is further generated based on a number of vehicles-for-hire that is associated with the at least one geographic node of activity corresponding to the at least one location.

Clause 8: A system for generating real-time predictions for vehicle transportation requests using machine learning, comprising at least one processor programmed and/or configured to: generate, with a machine-learning classification model, a transportation categorization for each consumer of a plurality of consumers based at least partially on historic transaction data comprising a plurality of transactions by each of the plurality of consumers, each plurality of transactions for each consumer including a subset of transactions for vehicle transportation; process a plurality of new transactions by each consumer of the plurality of consumers, each new transaction of the plurality of new transactions associated with at least one geographic node of activity; in response to processing the plurality of new transactions, generate, with machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generate a supply map interface comprising at least one visual identification of at least one location in which a number of requests for vehicle transportation is predicted to increase based on the plurality of vehicle transportation predictions.

Clause 9: The system of clause 8, wherein the at least one processor is programmed and/or configured to generate the transportation categorization for each consumer based at least partially on a transaction type.

Clause 10: The system of clauses 8 or 9, wherein the at least one processor is programmed and/or configured to determine the transaction type based on at least one of the following: a merchant category, a merchant identity, a transaction amount, a transaction frequency, or any combination thereof.

Clause 11: The system of any of clauses 8-10, wherein the at least one processor is programmed and/or configured to generate the transportation categorization for each consumer is based at least partially on condition data for the plurality of transactions, the condition data comprising at least one of the following: a time of day, a day of the week, a day of the year, a weather condition, a proximity to a specified location, a proximity to a specified event, or any combination thereof.

Clause 12: The system of any of clauses 8-11, wherein the at least one processor is further programmed and/or configured to automatically dispatch at least one vehicle to the at least one location.

Clause 13: The system of any of clauses 8-12, wherein the geographic node of activity corresponds to a location of at least one point-of-sale terminal.

Clause 14: The system of any of clauses 8-13, wherein the at least one processor is further programmed and/or configured to: receive location data associated with a geographic location of at least one vehicle-for-hire; and associate the geographic location of the at least one vehicle-for-hire with at least one geographic node of activity based on a proximity of the vehicle-for-hire to the at least one geographic node of activity, wherein the at least one visual identification of the at least one location in which a number of requests for vehicle transportation is predicted to increase is further generated based on a number of vehicles-for-hire that is associated with the at least one geographic node of activity corresponding to the at least one location.

Clause 15: A computer program product for generating real-time predictions for vehicle transportation requests using machine learning, comprising instructions, which, when executed by at least one processer, cause the at least one processor to: generate, with a machine-learning classification model, a transportation categorization for each consumer of a plurality of consumers based at least partially on historic transaction data comprising a plurality of transactions by each of the plurality of consumers, each plurality of transactions for each consumer including a subset of transactions for vehicle transportation; process a plurality of new transactions by each consumer of the plurality of consumers, each new transaction of the plurality of new transactions associated with at least one geographic node of activity; in response to processing the plurality of new transactions, generate, with machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generate a supply map interface comprising at least one visual identification of at least one location in which a number of requests for vehicle transportation is predicted to increase based on the plurality of vehicle transportation predictions.

Clause 16: The computer program product of clause 15, further comprising instructions, which, when executed by at least one processer, cause the at least one processor to: generate the transportation categorization for each consumer based at least partially on a transaction type, wherein the transaction type is determined based on at least one of the following: a merchant category, a merchant identity, a transaction amount, a transaction frequency, or any combination thereof.

Clause 17: The computer program product of any clauses 15 or 16, further comprising instructions, which, when executed by at least one processer, cause the at least one processor to: generate the transportation categorization for each consumer is based at least partially on condition data for the plurality of transactions, the condition data comprising at least one of the following: a time of day, a day of the week, a day of the year, a weather condition, a proximity to a specified location, a proximity to a specified event, or any combination thereof.

Clause 18: The computer program product of any of clauses 15-17, further comprising instructions, which, when executed by at least one processer, cause the at least one processor to automatically dispatch at least one vehicle to the at least one location.

Clause 19: The computer program product of any of clauses 15-18, wherein the geographic node of activity corresponds to a location of at least one point-of-sale terminal.

Clause 20: The computer program product of any of clauses 15-19, further comprising instructions, which, when executed by at least one processer, cause the at least one processor to: receive location data associated with a geographic location of at least one vehicle-for-hire; and associate the geographic location of the at least one vehicle-for-hire with at least one geographic node of activity based on a proximity of the vehicle-for-hire to the at least one geographic node of activity, wherein the at least one visual identification of the at least one location in which a number of requests for vehicle transportation is predicted to increase is further generated based on a number of vehicles-for-hire that is associated with the at least one geographic node of activity corresponding to the at least one location.

These and other features and characteristics of the present disclosure, as well as the methods of operation and functions of the related elements of structures and the combination of parts and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and the claims, the singular forms of "a," "an," and "the" include plural referents unless the context clearly dictates otherwise.

BRIEF DESCRIPTION OF THE DRAWINGS

Additional advantages and details of the non-limiting embodiments or aspects are explained in greater detail below with reference to the accompanying figures, in which:

FIG. 5B is an illustrative diagram of one non-limiting embodiment or aspect of a system and method for generating real-time predictions for vehicle transportation requests using machine learning;

FIG. 8 is a flow diagram of one non-limiting embodiment or aspect of a system and method for machine-learning-based traffic prediction; and FIG. 9 is a flow diagram of one non-limiting embodiment or aspect of a system and method for generating real-time predictions for vehicle transportation requests using machine learning.

DETAILED DESCRIPTION

Figure 1:
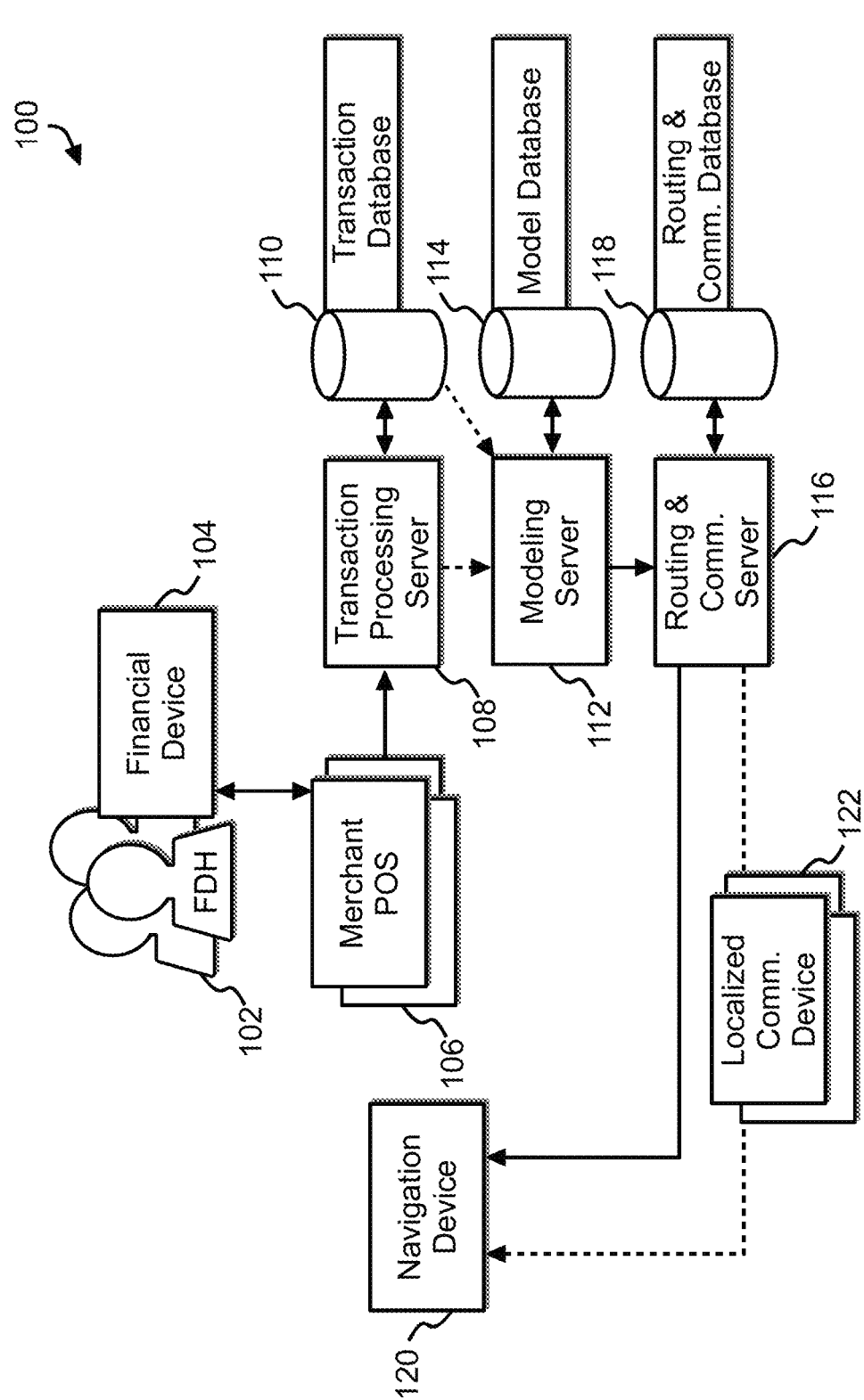
FIG. 1 is a schematic diagram of one non-limiting embodiment or aspect of a system and method for machine-learning-based traffic and/or vehicle demand prediction.

For purposes of the description hereinafter, the terms "upper," "lower," "right," "left," "vertical," "horizontal," "top," "bottom," "lateral," "longitudinal," and derivatives thereof shall relate to the disclosure as the disclosure is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting. Also, it should be understood that any numerical range recited herein is intended to include all sub-ranges subsumed therein. For example, a range of 1 to 10 is intended to include all sub-ranges between (and including) the recited minimum value of 1 and the recited maximum value of 10, that is, having a minimum value equal to or greater than 1 and a maximum value of equal to or less than 10.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "issuer institution" may refer to one or more entities, such as a bank, that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a physical financial instrument, such as a payment card, and/or may be electronic and used for electronic payments. The terms "issuer institution," "issuer bank," and "issuer system" may also refer to one or more computer systems operated by or on behalf of an issuer institution, such as a server computer executing one or more software applications. For example, an issuer system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that the tokens can be used to conduct a transaction without directly using the original account identifier. In some examples, an original account identifier, such as a PAN, may be associated with a plurality of tokens for different individuals or purposes. An issuer institution may be associated with a bank identification number (BIN) or other unique identifier that uniquely identifies the issuer institution among other issuer institutions.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The term "point-of-sale system" or "POS system", as used herein, may refer to one or more computers and/or peripheral devices used by a merchant to engage in payment transactions with customers, including one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a POS system, and/or any other device or system capable of communicating with a network.

As used herein, the term "financial device" may refer to a portable payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The financial device may include a volatile or a non-volatile memory to store information, such as an account identifier or a name of the account holder. The financial device may store account credentials locally on the device, in digital or non-digital representation, or may facilitate accessing account credentials stored in a medium that is accessible by the financial device in a connected network.

As used herein, the term "server" may refer to or include one or more processors or computers, storage devices, or similar computer arrangements that are operated by or facilitate communication and processing for multiple parties in a network environment, such as the internet. In some non-limiting embodiments, communication may be facilitated over one or more public or private network environments and that various other arrangements are possible. Further, multiple computers, e.g., servers, or other computerized devices, e.g., POS devices, directly or indirectly communicating in the network environment may constitute a system, such as a merchant's POS system. Reference to a server or a processor, as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The term "account data," as used herein, refers to any data concerning one or more accounts for one or more users. Account data may include, for example, one or more account identifiers, user identifiers, transaction histories, balances, credit limits, issuer institution identifiers, and/or the like.

In non-limiting embodiments or aspects of the present disclosure, consumer transaction data, both historic and real-time, may be used as a predictive proxy for directly tracking consumers traveling through a region. It may be presumed that a consumer who completes a card present transaction with a merchant (e.g., physically presents a financial device to a merchant POS terminal at a merchant location) will thereafter leave the merchant and travel along one or more channels of transit by one or more modes of transportation. That consumer enters the flow of traffic and increases the traffic in the area near the POS terminal by the consumer's physical presence in the network. In this manner, ongoing transaction data coming from merchant POS terminals (the location of which are known) may be used to predict trends in traffic that will occur subsequent to consumers completing purchases. For example, if there is a sudden spike in transaction activity at a cluster of POS terminals at a mall (e.g., one example geographic node of activity), then it may be inferred that, in a time period thereafter, the transportation traffic through or near that cluster of POS terminals will increase as well. Conversely, if there is an absence of transaction activity at one or more POS terminals in an area, then it may be inferred that traffic through or near that area will decrease. This premise may be leveraged to train machine-learning models to identify how consumers travel through a region (e.g., by what mode of transportation) based on transactions conducted by the consumers, and when transactions occur, to estimate traffic intensity thereby.

In further non-limiting embodiments or aspects of the present disclosure, consumer transaction data, both historic and real-time, may be used as a predictive proxy for predicting increases or decreases for vehicle-for-hire demand in specific locations within a region. It may be presumed that a consumer who completes a card-present transaction with a merchant (e.g., physically presents a financial device to a merchant POS terminal at a merchant location) will thereafter leave the merchant and travel using one or more modes of transportation. Moreover, a consumer's past purchasing behavior (e.g., the frequency with which a user has retained a vehicle-for-hire in the past) may be used to predict a likelihood that the consumer will attempt to engage a vehicle-for-hire (e.g., a ride-share vehicle, a taxi, a pedicab, a carriage, a rickshaw, a jitney, a rental car delivery service and/or the like) subsequent to completing the transaction. Further, the transaction type (e.g., as determined based on one or more factors such as merchant identity, merchant category, transaction amount, and/or the like) additionally or alternatively may be used to predict a likelihood that the consumer will attempt to engage a vehicle-for-hire subsequent to completing the transaction. For example, it may be determined that consumers who have recently completed transactions at alcohol-serving establishments are likely to engage a vehicle-for-hire during an identified time interval after completing the transaction. Conversely, it may be determined that consumers who have recently completed transactions at an establishment that is located outside of normal walking distance from residential areas or public transportation, or that generally sells large items that are more likely to be transported using a personal vehicle (e.g., a furniture store or the like), are less likely to engage a vehicle-for-hire during an identified time interval after completing the transaction.

In addition, the predicted likelihood that the consumer will attempt to engage a vehicle-for-hire subsequent to completing the transaction may be further determined based on one or more external conditions that may be unrelated to the instant purchase or the consumer's past spending behavior. For instance, it may be determined that consumers may be more likely to request a vehicle to hire and less likely use other modes of transportation when certain weather conditions are present, during certain times of day, during certain days of the week, during certain days of the year, or when a special event is occurring in the area. For example, in some instances it may be determined that consumers are more likely to request a vehicle-for-hire and less likely to walk to public transportation during instances of bad weather, during times of day when higher crime rates are generally experienced, on certain days of the week (such as weekends), or on certain days of the year (e.g., holidays). In non-limiting embodiments, the system described herein may receive condition data regarding one or more external conditions, including the foregoing examples, from one or more servers (e.g., via the Internet) and such condition data may be further incorporated in order to improve the relevant predictive models.

For example, after completing a card-present transaction, a consumer is likely to remain in the vicinity of the POS terminal where the transaction was completed for a predictable or identifiable time period. The physical presence of more consumers in the vicinity of the POS terminal increases the potential demand for vehicles-for-hire in the area surrounding that POS terminal, particularly if a number of the consumers can be identified as likely to request a vehicle-for-hire based on past purchasing behavior and/or the present transaction type. This trend may be predictive of spikes in demand for vehicles-for-hire, which might not otherwise be foreseeable. For example, if there is a sudden spike in transaction activity at a cluster of POS terminals in the vicinity of one or more alcohol-serving establishments (e.g., one example geographic node of activity), then it may be inferred that, in a time period thereafter, the demand for vehicles-for-hire in or near that cluster of POS terminals will increase as well. Conversely, if there is an absence of transaction activity at one or more POS terminals in an area, then it may be determined that demand for vehicles-for-hire in or near that area will decrease. These trends may be leveraged to train machine-learning models to identify optimal travel locations and paths for a vehicle-for-hire to engage a new customer as quickly as possible.

In non-limiting embodiments or aspects of the present disclosure, described systems and methods improve over prior art systems by providing a predictive traffic estimation system rather than a reactive traffic estimation system, wherein predictions are further based on extrinsic parameters other than transit data itself. The described systems and methods may be used as standalone predictive systems, or in combination with other traffic models to augment the efficiency and accuracy of computer-driven traffic prediction systems. Described systems and methods herein use machine-learning models to identify the mode of transportation that a consumer may take based on the consumer's purchase patterns. Based at least partly on the consumer's category of transportation, the consumer's ongoing transactions may be used to extrapolate and predict regional traffic to and from points of sale, specific to those modes of transportation and even before the consumer has reentered the transportation network. This leads to faster and more accurate traffic prediction times. For example, the system and methods may lead to faster and more accurate traffic prediction times that are further in advance of traffic events, because regional traffic may be predicted based on where consumers will be and how the consumers will travel through the region. Furthermore, traffic predictions are improved by aggregating in real-time the activity of the individual consumers who are transacting in the region, because a transaction processing server may identify transactions occurring as transaction authorization requests are being processed. In addition, all computer systems and networks that rely on accurate and efficient traffic prediction (e.g., emergency response networks, commuter navigation systems, public transit systems, self-driving vehicle navigation systems, etc.) are improved thereby.

In further non-limiting embodiments or aspects of the present disclosure, described systems and methods improve over prior art systems by providing a predictive vehicle-for-hire demand estimation system, wherein predictions are based on extrinsic parameters other than current location data provided via customer devices. The described systems and methods may be used as standalone predictive systems or in combination with existing systems for connecting a vehicle-for-hire with a customer to improve the efficiency and accuracy of such systems.

Described systems and methods herein use machine-learning models to identify the likelihood that a consumer will request a vehicle-for-hire subsequent to engaging in a transaction based on the consumer's prior purchase patterns and the circumstances surrounding the transaction. Based at least partly on the consumer's category of transportation, the consumer's ongoing transactions may be used to extrapolate and predict increases or decreases in the demand for vehicles-for-hire in the vicinity of points of sale, even before the consumer has reentered the transportation network. This leads to faster and more accurate predictions of demand for vehicles-for-hire. For example, the systems and methods described herein may provide faster and more accurate predictions of spikes in demand for vehicles-for-hire resulting from special events that may not be publicly known, such as the conclusion of a large social gathering where large numbers of consumers may simultaneously exit an alcohol-serving establishment and require transportation. Furthermore, vehicle-for-hire demand predictions are improved by aggregating in real-time the activity of the individual consumers who are transacting in the region, because a transaction processing server may identify transactions occurring as transaction authorization requests are being processed. In addition, all computer systems and networks that seek to connect vehicles-for-hire with customers (e.g., online portals for engaging a taxi or ride-share vehicle) are improved thereby.

With specific reference to FIG. 1, and in non-limiting embodiments or aspects, provided is a system 100 for machine-learning-based traffic prediction. The system 100 includes one or more financial device holders (FDH) 102, also referred to herein as consumers, that each have one or more financial devices 104 to complete transactions with merchants in a region, via one or more merchant point-of-sale (POS) systems, e.g., one or more POS terminals. In some non-limiting embodiments, the region may include any geographic area in which exist one or more channels of transit and one or more POS terminals 106. Each financial device 104 may be associated with a transaction account for settlement of funds to complete transactions with merchants. Each transaction account may be associated with one or more financial devices 104 and may be associated with one or more financial device holders 102, e.g., consumers. The financial device 104 may be used to provide an account identifier for a respective transaction account for the completion of the transaction. Authorization requests for transactions between financial devices 104 and merchant POS terminals 106 are received and processed by a transaction processing server 108, which may be controlled by a transaction service provider. The transaction processing server 108 is communicatively connected to a transaction database 110, to store transaction data associated with the one or more transactions being completed between financial devices 104 and merchant POS terminals 106, including, but not limited to: transaction amount, transaction time, transaction date, transaction type, merchant type, transaction location, account identifier, financial device holder identifier, transaction description, and/or the like.

With further reference to FIG. 1, and in further non-limiting embodiments, the system 100 includes a modeling server 112, which may be the same server as the transaction processing server 108. The modeling server 112 is configured to store and run a machine-learning classification model to generate a transportation categorization for each consumer, e.g., financial device holder 102. The transportation categorization is representative of a most likely mode of transportation to be taken by the consumer when the consumer travels to complete a transaction in the subject region. For example, the transportation categorization may include, but is not limited to: motor vehicle (e.g., personal vehicle, hired vehicle, taxi, etc.), train (e.g., light rail, subway, etc.), bus, ferry, pedestrian, bicycle, and/or the like. The transportation categorization may be used to associate a consumer's transactions with channels of transit corresponding to the consumer's likely mode of transportation. For example, if consumer A is assigned a transportation categorization that includes transit by motor vehicle, consumer A's future transactions will indicate that roadway traffic will likely increase in the time period subsequent to the transaction. In another example, if consumer B is assigned a transportation categorization that includes rail transit, consumer B's future transactions will indicate that rail traffic will likely increase in the time period subsequent to the transaction. In another example, if consumer C is assigned a transportation categorization that includes hired vehicles, consumer C's future transactions may indicate that demand for vehicles-for-hire will likely increase in the time period subsequent to the transaction.

With further reference to FIG. 1, and in further non-limiting embodiments, the machine-learning classification model may be trained to determine a transportation categorization based on types of transactions that are indicative of corresponding modes of transportation. For example, a transportation categorization may include transit by motor vehicle, which may be assigned to consumers with types of transactions including: gasoline purchase, toll road payment, vehicle purchase or lease payment, vehicle repair service, vehicle maintenance service, and/or the like. These indicators may be received in the transaction data of authorization requests processed by a transaction processing server 108, or received from a database of merchant data that indicates the respective merchant's type of business. In another example, a transportation categorization may include transit by rail, which may be assigned to consumers with types of transactions including: rail pass purchases, public transit cards, and/or the like. A consumer lacking transaction types associated with one category of transit may also be assumed to belong to another category of transit. For example, if a consumer has not made any gasoline purchases and has not made any purchases at auto supply stores, auto service centers, or car dealerships, it may be inferred that the consumer does not own a motor vehicle and is therefore more likely to travel by a non-motor vehicle, unless by a vehicle-for-hire, such as a taxi, a ride-share vehicle, and/or the like. Additionally or alternatively, a consumer that has regularly completed transactions with hired vehicle services in the past may be predicted to engage in further transactions with hired vehicles under similar conditions in the future.

With further reference to FIG. 1, and in further non-limiting embodiments, the machine-learning classification model may include any suitable predictive classification model that may be trained on historic transactions to output classifications based on a current transaction data input. For example, the machine-learning classification model may include, but is not limited to: linear classifier models (e.g., logistic regression, naive Bayes classifier, etc.), support vector machine models, decision tree models, boosted tree models, random forest models, neural network models, nearest neighbor models, and/or the like. The modeling server 112 may receive transaction data for model training or classification by communicative connection to the transaction database 110, either directly or indirectly via the transaction processing server 108 or other server. Machine-learning classification model data may be stored in a model database 114 that is communicatively connected to the modeling server 112. The model database 114 may be the same database as the transaction database 110. In further non-limiting embodiments, the model may be a reinforcement learning-based solution (e.g., recurrent neural networks, Q-learning, etc.), which may classify consumers' transactions assigning positive or negative reinforcement scores. The results of such a reinforcement-based learning may be stored in the model database 114 categorizing the consumer according to the transportation mode. It will be appreciated that other configurations are possible.

With further reference to FIG. 1, and in further non-limiting embodiments, the modeling server 112 may also be used to identify one or more geographic nodes of activity in the region. A geographic node of activity may be a geographic area or point that is representative of the location of one or more merchant POS terminals 106 in a region. For example, a geographic node of activity may be a geographic area around and including one or more POS terminals. In a further example, a geographic node of activity may be a centroid of a cluster of one or more POS terminals. The node may be a point located near or on a channel of transit, such as on a rail line, a rail station, a roadway, a road intersection, a bus stop, a vehicle-for-hire pickup location (e.g., a taxi stand), and/or the like. A geographic node of activity may also be the location of a POS terminal. To make such a determination, mapping data may be stored in the model database 114 or another database, such as a routing and communication database 118, and the locations of POS terminals may be used to identify one or more geographic nodes of activity. See FIGS. 2-7 for non-limiting illustrative diagrams representative of a method including the step of identifying geographic nodes of activity.

The modeling server 112 may be used to generate, based at least partially on current transactions in the region (i.e., "new transactions") and/or the determined transportation categorization for the consumers completing those transactions, an estimate of traffic intensity for the geographic node(s) of activity. The estimate of traffic intensity is representative of a predicted volume of traffic for a given mode of transportation that passes through or near the geographic node of activity. Increased numbers of consumer transactions may be considered to be proportional to increased traffic. The estimate of traffic intensity may be any quantitative or qualitative value capable of being compared to a predetermined threshold. In other words, the estimate of traffic intensity may be numerical (e.g., a percentile, a score, such as from 0 to 100 or 0 to 1, a rate of travelers per unit time, and/or the like) or value-related categorical (e.g., low/medium/high, a star rating, a color intensity such as green/yellow/red, and/or the like). A numerical estimate of traffic intensity may be an absolute value, a score in a range, a rate, a differential, and/or the like, and may be whole numbers, decimals, fractions, or any other quantitative representation.

Additionally, the modeling server 112 may be used to generate, based at least partially on current transactions in the region and/or the determined transportation categorization for the consumers completing those transactions, an estimate of the demand for a particular type of transportation, such as a vehicle-for-hire, for the geographic node(s) of activity. The estimate of demand is representative of a predicted number of transportation requests originating from within and/or near the geographic node of activity that will be initiated during an identified time interval and may be represented as a vehicle transportation prediction. Increased numbers of card-present transactions, generally, or in identified merchant categories may be considered to be proportional to an increase in demand for vehicles-for-hire within and/or near the node. The estimate of demand may be any quantitative or qualitative value capable of being compared to a predetermined threshold and/or to like parameters of other nodes in the region. In other words, the estimate of vehicle-for-hire demand may be numerical (e.g., a percentile, a score, such as from 0 to 100 or 0 to 1, a rate of travelers per unit time, and/or the like) or value-related categorical (e.g., low/medium/high, a star rating, a color intensity such as green/yellow/red, and/or the like). A numerical estimate of vehicle hire demand may be an absolute value, a score in a range, a rate, a differential, and/or the like, and may be whole numbers, decimals, fractions, or any other quantitative representation.

With further reference to FIG. 1, and in further non-limiting embodiments, the modeling server 112 may compare the estimate of traffic intensity for the at least one geographic node of activity to a threshold of traffic intensity for the at least one geographic node of activity. The threshold of traffic intensity may be based on any parameter or value indicative of an amount of traffic above or below which would be desirable to reroute travelers in the region either toward or away from the geographic node of activity. For example, the threshold of traffic intensity may be a lower bound and it would be desirable to reroute traffic through or near the geographic node of activity because the estimate of traffic intensity is equal to and/or less than the threshold of traffic intensity. Alternatively, the threshold of traffic intensity may be an upper bound and it would be desirable to reroute traffic away from or around the geographic node of activity because the estimate of traffic intensity is equal to and/or greater than the threshold of traffic intensity. The threshold of traffic intensity may be predetermined and based at least partially on a capacity of traffic of one or more channels of transit that pass through or near a geographic node of activity. A capacity of traffic may be a rate of traffic and/or number of vehicles (of the evaluated mode of transportation) that may travel through the channel of transit at a desired speed for regular traffic flow, whereby additional traffic beyond the capacity of traffic would either reduce the safety and/or speed of travelers in the channel of traffic. For example, if the geographic node of activity is a geographic area, traffic capacities for all channels of transit passing through and/or near that geographic area may be cumulated and set as an upper threshold of traffic intensity. In a further example, if the geographic node of activity is a geographic point, traffic capacities for all channels of transit passing through and/or near that geographic point may be cumulated and set as an upper threshold of traffic intensity. Multiple thresholds may be employed in combination for the same geographic node of activity.

In some non-limiting embodiments, traffic intensity estimate and threshold determination steps may be carried out by the modeling server 112 or another server in the system 100. The cumulated traffic intensity at a current state may be periodically stored in a database, such as the communication database 118 or model database 114, and may be used in the future for determining state transitions. In some non-limiting embodiments, a state-based transition system (e.g., a Markov decision engine) may be used to predict the likelihood of traffic evolution in the network, according to the historic stored data. The data for such a state-based transition may be obtained from the communication database 118, the model database 114, or any combination thereof. It will be appreciated that other configurations are possible.

Additionally, with continued reference to FIG. 1, and in further non-limiting embodiments, the modeling server 112 may compare the estimate of vehicle-for-hire demand for the at least one geographic node of activity to a threshold of vehicle-for-hire demand for the at least one geographic node of activity and/or to the vehicle-for-hire demand of other geographic notes of activity in the region. The threshold of vehicle-for-hire demand may be based on any parameter or value indicative of an amount of demand above or below which would be desirable to reroute vehicles-for-hire, which are seeking to acquire customers either toward or away from the geographic node of activity. For example, the threshold of vehicle-for-hire demand may be a lower bound and it would be desirable to reroute vehicles-for-hire away from the geographic node of activity because the supply of vehicles-for-hire in the vicinity of the geographic node of activity is predicted to be greater than or equal to the demand for vehicles-for-hire.

In non-limiting embodiments, the threshold of traffic intensity may be an upper bound and it may be desirable to reroute vehicles-for-hire to or near the geographic node of activity because the demand for vehicles-for-hire is predicted to greatly exceed the supply of vehicles-for-hire in the vicinity of the geographic node. The threshold of vehicle-for-hire demand may be predetermined and/or based at least partially on a determined or predicted number of vehicles-for-hire that are likely to be seeking customers in the vicinity of the geographic node during a given time period. For example, if the geographic node of activity is a geographic area, the number of vehicles-for-hire that are actively seeking customers in the vicinity of the geographic node may be determined based on navigation system data (e.g., GPS data) or user-input location data received from transceivers associated with the vehicles-for-hire themselves and/or from a central dispatch location. Additionally or alternatively, the number of vehicles-for-hire that are actively seeking customers in the vicinity of the geographic node may be predicted based on historical data (e.g., based on a number of transactions involving vehicles-for-hire that took place during an analogous time period in the past). Multiple thresholds may be employed in combination for the same geographic node of activity. In some non-limiting embodiments, vehicle-for-hire demand estimate and threshold determination steps may be carried out by the modeling server 112 or another server in the system 100. The cumulated vehicle-for-hire demand at a current state may be periodically stored in a database, such as the communication database 118 or model database 114, and may be used in the future for determining state transitions. In some non-limiting embodiments, a state-based transition system (e.g., a Markov decision engine) may be used to predict the likelihood of vehicle-for-hire demand evolution in the network, according to the historic stored data. The data for such state-based transition may be obtained from the communication database 118, the model database 114, or any combination thereof. It will be appreciated that other configurations are possible.

With further reference to FIG. 1, and in further non-limiting embodiments, the system 100 may include a routing and communication server 116 for responding to changes in estimated traffic intensity and/or vehicle-for-hire demand, including when estimated traffic intensity satisfies threshold traffic intensity and/or vehicle-for-hire demand. Routing and communication may occur on the same server or different servers. The routing and communication server 116 may be the same server as the modeling server 112 and/or the transaction processing server 108. The routing and communication server 116, in response to the determination that the estimate of traffic intensity and/or vehicle hire demand for one or more geographic nodes of activity satisfy a corresponding threshold, may be triggered to take one or more actions. Those actions may include generating and communicating a communication to one or more navigation devices 120 to modify navigation route(s) in the subject region. A navigation device 120 may be a mobile device or other computing device moving with a traveler who is traveling through the region. A navigation device 120 may also be a server that computes a navigation route for a traveler and transmits the data to a computing device of the traveler. For example, a navigation device 120 may be a smartphone running a mapping application. In another example, a navigation device 120 may be a mapping server of a navigation service that sends and receives data to a user via a mobile device. A navigation device 120 may generate one or more navigation routes for one or more travelers and/or vehicle-for-hire operators. In non-limiting embodiments, the generated communication may be sent by the routing and communication server 116 to the navigation device 120 to modify a navigation route, e.g., change at least one segment of a navigation route of a traveler and/or vehicle-for-hire operator. A segment of a navigation route may be modified such that the navigation route is re-routed closer to or farther away from one or more geographic nodes of activity. For instance, a navigation route may be modified to pass through or near geographic nodes of activity with lower estimates of traffic intensity, and the navigation route may be modified to not pass through and/or avoid geographic nodes of activity with higher estimates of traffic intensity. For instance, a navigation route for a vehicle-for-hire may be modified to pass through or near geographic nodes of activity where the demand for vehicles-for-hire is predicted to exceed the supply thereof. There may be a number of navigation devices 120 in a region at one point in time, and a number of navigation routes of said navigation devices 120 may be modified in response to communications from the routing and communication server 116.

With further reference to FIG. 1, and in further non-limiting embodiments, the communication(s) configured to modify one or more navigation routes of one or more navigation devices 120 may be communicated to navigation devices 120 via one or more localized communication devices 122 in the region. A localized communication device 122 may be any communication device, e.g., a transceiver, a local network relay node, etc., configured to receive the communication from the routing and communication server 116 and send the communication to a navigation device 120.

A localized communication device 122 may be associated with a specific subregion of the region, in which the localized communication device 122 communicated with navigation devices 120 traveling through the subregion, e.g., a geographic portion of the subject region that is less than or equal to the area of the region. A subregion may be associated with one or more localized communication devices 122, and a localized communication device 122 may be associated with one or more subregions. Each localized communication device 122 may be configured to communicate with other localized communication devices 122, in addition to navigation devices 120 and the routing and communication server. Localized communication devices 122 may also be associated with merchants and integrated with merchant computing devices. Localized communication devices 122 may also correspond to, and be positioned in, at, or near, geographic nodes of activity. Localized communication devices 122 may communicate with the routing and communication server 116 in real-time as transactions in the region are being processed by the transaction processing server 108 and are being used to compute estimates of traffic intensity and/or vehicle-for-hire demand by the modeling server 112.

Figure 2:
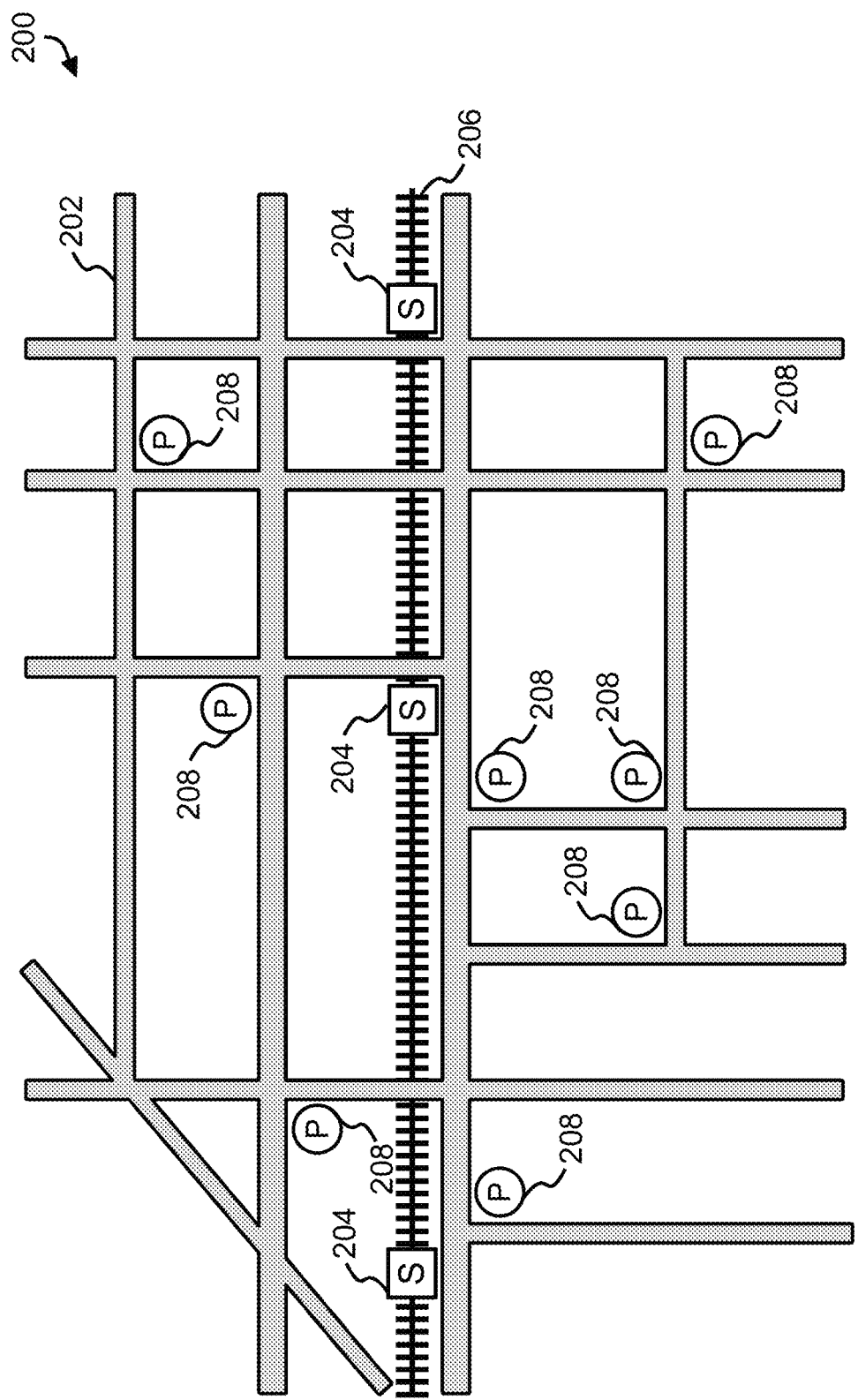
FIG. 2 is an illustrative diagram of one non-limiting embodiment or aspect of a system and method for machine-learning-based traffic and/or vehicle demand prediction.

With specific reference to FIG. 2, and in non-limiting embodiments or aspects, provided is an illustrative diagram of a system and method for machine-learning-based traffic prediction and/or vehicle-for-hire demand prediction. Depicted is region 200 that includes various channels of transit, including a road network 202, a number of rail stations (S) 204, and a railway 206. In some non-limiting embodiments, region 200 may include other channels of transit not explicitly depicted herein, including waterways, sidewalks, and the like. The region 200 further includes merchant POS terminals (P) 208 throughout the region, with which consumers, e.g., financial device holders, may complete transactions. The POS terminals 208 may be communicatively connected to a transaction processing server to receive and process the transaction data associated with purchases made by consumers in the region 200. The transaction processing server may or may not be physically located in the region 200. The transaction data may be used to generate transportation categorizations for consumers that are representative of a mode of transportation to be taken by the respective consumer when traveling to complete a transaction in the region 200. The transaction data may also be used to generate estimates of traffic intensity and/or vehicle-for-hire demand, discussed further below.

Figure 3:
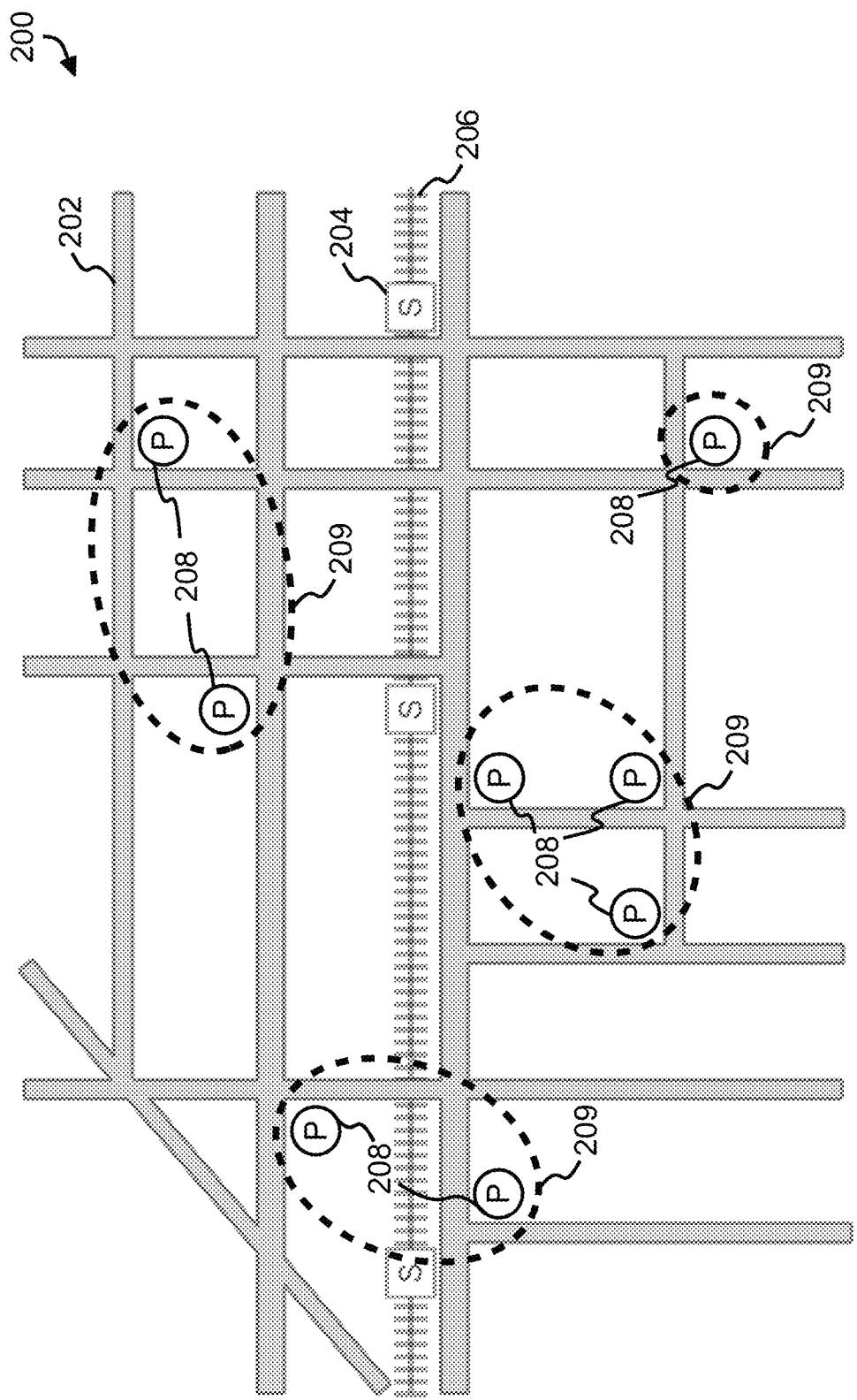
FIG. 3 is an illustrative diagram of one non-limiting embodiment or aspect of a system and method for generating predictions for machine-learning-based traffic and/or vehicle transportation requests using machine learning.

With specific reference to FIG. 3, and in non-limiting embodiments or aspects, provided is a further illustrative diagram of a system and method for machine-learning-based traffic prediction and/or vehicle-for-hire demand prediction. As depicted, the POS terminals 208 in the region 200 may be grouped into clusters of transaction activity 209 in the region 200. A cluster of transaction activity 209 may include one or more POS terminals 208, and a cluster 209 may overlap and/or include one or more of the same POS terminals 208 as another cluster 209.

Figure 4:
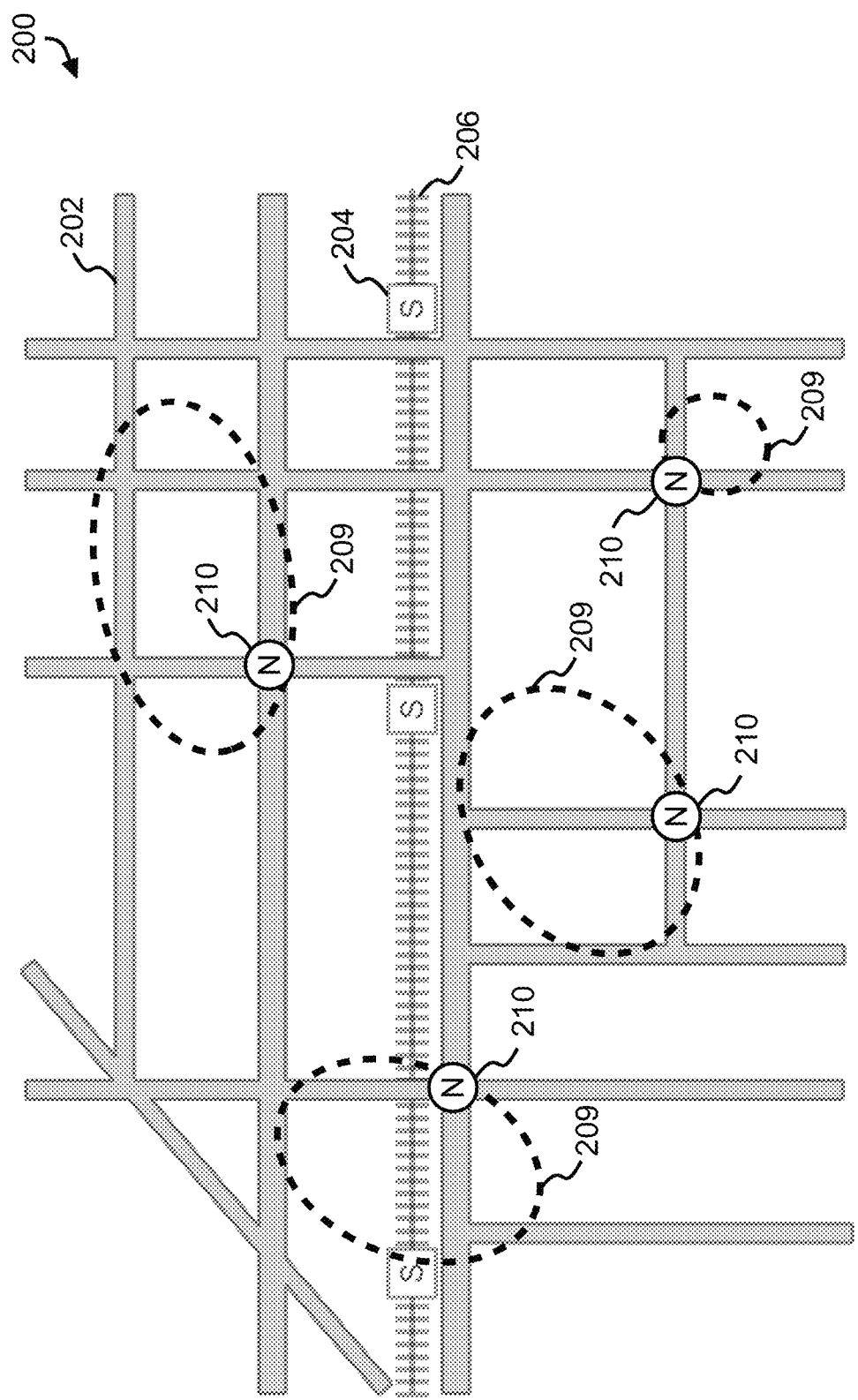
FIG. 4 is an illustrative diagram of one non-limiting embodiment or aspect of a system and method for generating predictions for machine-learning-based traffic and/or vehicle transportation requests using machine learning.

With specific reference to FIG. 4, and in non-limiting embodiments or aspects, provided is a further illustrative diagram of a system and method for machine-learning-based traffic prediction and/or vehicle-for-hire demand prediction. Geographic nodes of activity 210 (shown with the label "N" in FIGS. 4-7) may be identified to represent groups of one or more POS terminals 208 in the region 200. In the non-limiting embodiment depicted, the geographic node of activity 210 is determined in a position on a channel of transit and within an area of a corresponding cluster of transaction activity 209. Geographic nodes of activity 210 may also be positioned on intersections in channels of transit, as depicted in the non-limiting exemplary embodiment. In some non-limiting embodiments, clusters of transaction activity 209 need not be generated prior to the identification of geographic nodes of activity, and a geographic node of activity 210 may correspond directly with the location of one or more POS terminals 208. Geographic nodes of activity 210 may also be automatically determined by calculating the centroid of a cluster of transaction activity 209. It will be appreciated that many configurations are possible.

Figure 5A:
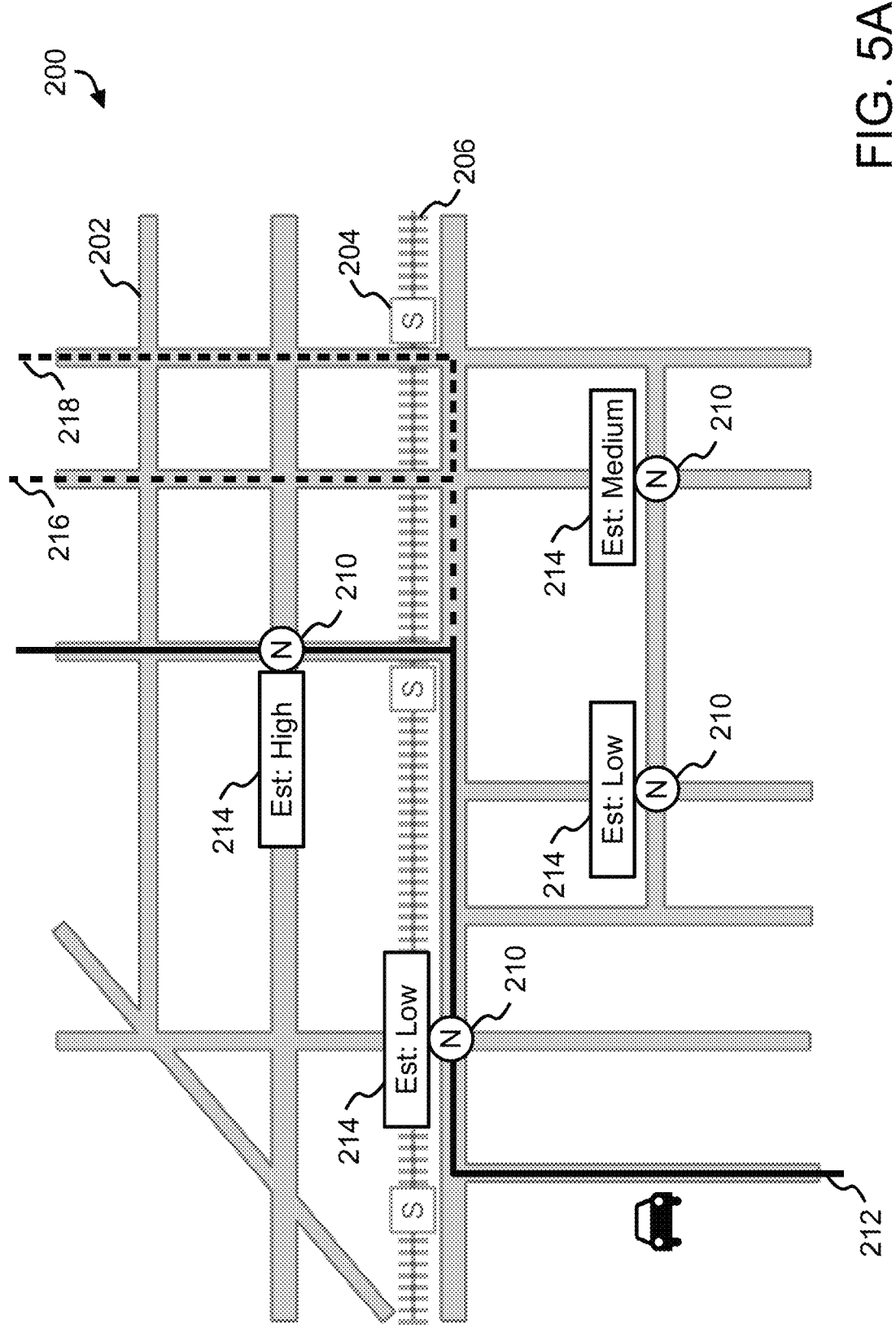
FIG. 5A is an illustrative diagram of one non-limiting embodiment or aspect of a system and method for machine-learning-based traffic prediction.

With specific reference to FIG. 5A, and in non-limiting embodiments or aspects, provided is a further illustrative diagram of a system and method for machine-learning-based traffic prediction. A modeling server may generate an estimate of traffic intensity 214 for each geographic node of activity 210 in the region 200. In the non-limiting example depiction, the estimates of traffic intensity 214 are shown as categorical ratings of traffic intensity, including labels such as low, medium, and high. It will be appreciated that these labels are for illustration, and any of the previously described estimate types, including numerical scores, may be used for a geographic node of activity 210. Also within the region 200 are any number of travelers, and a traveler may use a navigation device to determine an initial navigation route 212 through the region. In the non-limiting embodiment of FIG. 5A, the depicted initial navigation route 212 is for an example traveler that is traveling by motor vehicle from the lower-left to the upper-right of the region 200. It will be appreciated that the steps herein may be carried out for other modes of transportation and channels of transit. The non-limiting example depicted initial navigation route 212 also passes through some of the geographic nodes of activity 210 in the region 200. It will be appreciated that navigation routes 212 may pass through geographic nodes of activity 210 if geographic nodes of activity 210 are points positioned on channels of transit or areas including channels of transit. It will be appreciated that navigation routes 212 may also include segments adjacent to, but not passing through, geographic nodes of activity 210.

With further reference to FIG. 5A, and in further non-limiting embodiments, a modeling server may compare estimates of traffic intensity 214 to thresholds of traffic intensity for respective nodes 210 in the region 200. If an estimate 214 satisfies a threshold, a server may trigger an action to modify one or more navigation routes 212 in the region 200. For example, the action may be to generate and communicate a communication to one or more navigation devices to modify an initial navigation route 212 to avoid nodes 210 with high traffic intensity (e.g., nodes having estimates of traffic intensity satisfying upper bound thresholds), and/or pass near or through nodes 210 with low traffic intensity (e.g., nodes having estimates of traffic intensity satisfying lower bound thresholds). In the non-limiting example depiction, two nodes 210 have low estimates of traffic intensity 214, one node 210 has a medium estimate of traffic intensity 214, and one node 210 has a high estimate of traffic intensity 214. A navigation device of a traveler in the region 200 may modify the initial navigation route 212 to one or more new navigation routes 216, 218. A new navigation route 216, 218 may be suggested to a traveler for selection, or the initial navigation route 212 may be automatically modified by the navigation device. New navigation routes 216, 218 may also be generated variably based on how much an estimate of traffic intensity 214 surpasses a threshold. For example, specifically concerning the node 210 with a high estimate of traffic intensity 214, a first new navigation route 216 may be suggested/generated if the threshold is met or surpassed by a certain amount, whereas a second new navigation route 218 may be suggested/generated if the threshold is met or surpassed by a greater amount. In both cases, the initial navigation route 212 is modified to avoid areas of high traffic intensity.

With specific reference to FIG. 5B, and in non-limiting embodiments or aspects, provided is a further illustrative diagram of a system and method for generating real-time predictions for vehicle transportation requests using machine learning. A modeling server may generate an estimate of predicted vehicle-for-hire demand 254 for each geographic node of activity 260 in the region 250. In the non-limiting example depicted in FIG. 5B, the estimates of predicted vehicle-for-hire demand 254 are shown as categorical ratings of predicted demand, including labels such as low, medium, and high. It will be appreciated that these labels are for illustration purposes only, and that any of the previously described estimate types, including numerical scores, may be used for a geographic node of activity 260. Also within the region 250 are any number of vehicles-for-hire, and a vehicle-for-hire may use a navigation device to determine an initial navigation route 252 through the region when seeking to acquire a customer. In the non-limiting embodiment shown in FIG. 5B, the depicted initial navigation route 252 is for an example vehicle-for-hire such as a taxi cab or a vehicle participating in a ride-share program that is seeking to acquire a customer in the region 250. It will be appreciated that the steps herein may be carried out for other modes of transportation and channels of transit. The non-limiting example of the initial navigation route 252 depicted in FIG. 5B also passes through some of the geographic nodes of activity 260 in the region 250. It will be appreciated that navigation routes 252 may pass through geographic nodes of activity 260 if geographic nodes of activity 260 are points positioned on channels of transit or areas including channels of transit. It will be appreciated that navigation routes 252 may also include segments adjacent to, but not passing through, geographic nodes of activity 260.

With further reference to FIG. 5B, and in non-limiting embodiments or aspects, a modeling server may compare estimates of predicted vehicle-for-hire demand 254 to thresholds of predictive vehicle-for-hire demand for respective nodes 260 in the region 250. If an estimate 254 satisfies a threshold (e.g., meets or exceeds the threshold value), a server may trigger an action to modify one or more navigation routes 252 in the region 250. For example, the action may be to generate and communicate a communication to one or more navigation devices to modify an initial navigation route 252 to steer toward nodes 260 with high predicted vehicle-for-hire demand (e.g., nodes having predicted vehicle-for-hire demands exceeding lower bound thresholds), and/or to avoid nodes 260 with low predicted vehicle-for-hire demand (e.g., nodes having predicted vehicle-for-hire demands falling below lower bound thresholds). In the non-limiting example depicted in FIG. 5B, two nodes 260 have low predicted vehicle-for-hire demand 254, one node 260 has a medium predicted vehicle-for-hire demand 254, and one node 260 has a high predicted vehicle-for-hire demand 254. A navigation device of a vehicle-for-hire in the region 250 may modify the initial navigation route 252 to one or more new navigation routes 256, 258. A new navigation route 256, 258 may be suggested to a vehicle-for-hire operator for selection, or the initial navigation route 252 may be automatically modified by the navigation device. New navigation routes 256, 258 may also be generated variably based on how much an estimate of traffic intensity 254 surpasses a threshold. For example, specifically concerning the node 260 with a high predicted vehicle-for-hire demand 254, a first new navigation route 256 may be suggested or generated automatically if the threshold is met or surpassed by a certain amount, whereas a selection among a first new navigation route 256 and a second new navigation route 258 may be suggested or generated if the threshold is met or surpassed by a lesser amount. In both cases, the initial navigation route 252 is modified to steer toward nodes having a higher predicted vehicle-for-hire demand, however, in the latter case, when the difference in predicted vehicle-for-hire demand is not as significant, the vehicle operator is provided with a greater number of choices to allow for selection among potential routes based on other factors such as vehicle operator preference.

Figure 6A:
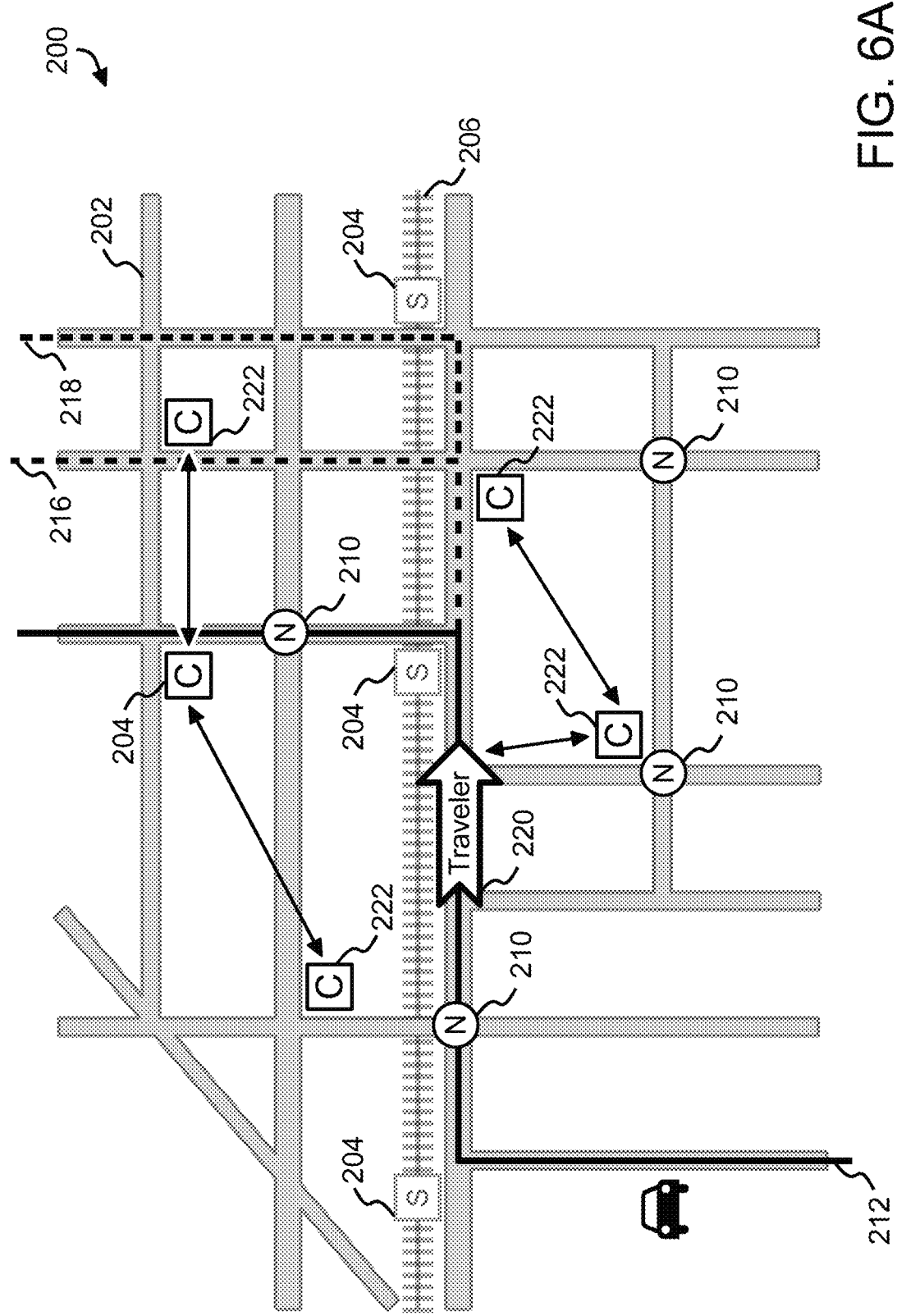
FIG. 6A is an illustrative diagram of one non-limiting embodiment or aspect of a system and method for machine-learning-based traffic prediction.

With specific reference to FIG. 6A, and in non-limiting embodiments or aspects, provided is a further illustrative diagram of a system and method for machine-learning-based traffic prediction. The region 200 includes one or more localized communication devices 222 that are configured to communicate with a routing and communication server, other localized communication devices 222, and travelers 220 in the region 200. The localized communication devices 222 may be configured to communicate with other devices 222 and travelers 220 within an effective radius or area of the region 200, also referred to herein as a subregion. Travelers 220 may have navigation devices traveling with them in the region 200, by which travelers 220 are navigating and that are updated via nearby localized communication devices 222. Travelers 220 may also have personal communication devices that receive routing information from a remote navigation device via nearby localized communication devices 222. The localized communication devices 222 may also directly correspond to or approximate the position of one or more geographic nodes of activity 210. Localized communication devices 222 may communicate the local traffic intensity of surrounding points, areas, or channels of transit to other localized communication devices 222 to more directly coordinate the flow of traffic through the region 200. As shown, a localized communication device 222 is in communication with the traveler 220, and the initial navigation route 212 through the region 200 will be modified by the system to either a first new navigation route 216 or a second new navigation route 218. It will be appreciated that any number of new navigation routes 216, 218 may be generated and/or communicated to a traveler's 220 navigation device, in order to avoid nodes 210 of high traffic intensity or seek out nodes 210 of low traffic intensity.

Figure 6B:
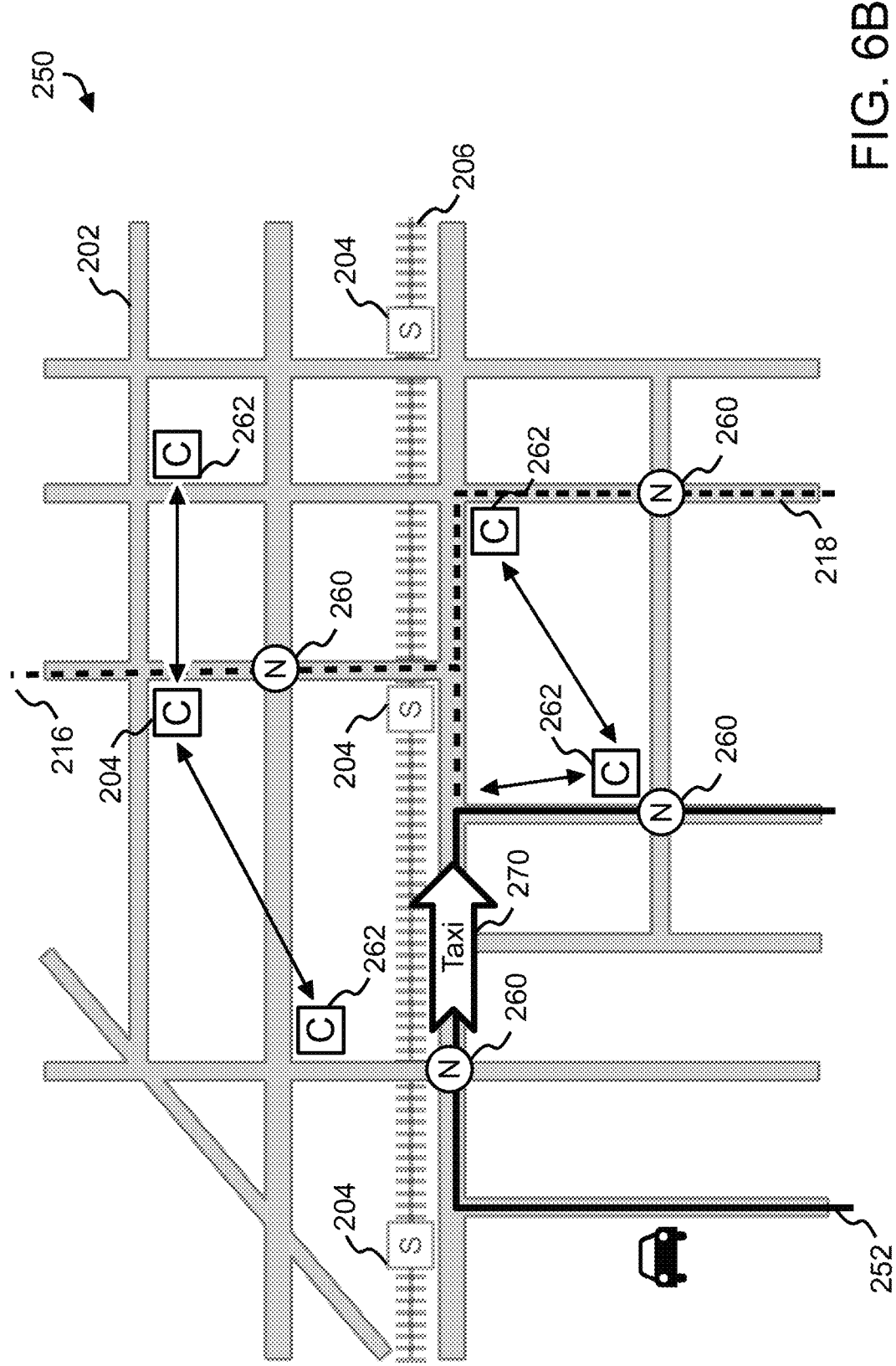
FIG. 6B is an illustrative diagram of one non-limiting embodiment or aspect of a system and method for generating real-time predictions for vehicle transportation requests using machine learning.

With specific reference to FIG. 6B, and in non-limiting embodiments or aspects, provided is a further illustrative diagram of a system and method for machine-learning-based traffic prediction. The region 250 includes one or more localized communication devices 262 that are configured to communicate with a routing and communication server, other localized communication devices 262, and vehicles-for-hire 270 in the region 250. The localized communication devices 262 may be configured to communicate with other devices 262 and vehicles-for-hire 270 within an effective radius or area of the region 250, also referred to herein as a subregion. Vehicles-for-hire 270 may have navigation devices traveling with them in the region 250, by which the vehicles-for-hire 270 are navigating and that are updated via nearby localized communication devices 262. Vehicles-for-hire 270 may also have personal communication devices that receive routing information from a remote navigation device via nearby localized communication devices 262. The localized communication devices 262 may also directly correspond to or approximate the position of one or more geographic nodes of activity 260. Localized communication devices 262 may communicate the predicted vehicle-for-hire demand of surrounding points, areas, or channels of transit to other localized communication devices 262 to more directly coordinate the flow of multiple vehicles-for-hire within the region 250 to appropriate geographic nodes of activity 260. As shown, a localized communication device 262 is in communication with the vehicle-for-hire 270, and the initial navigation route 252 through the region 250 to acquire a customer will be modified by the system to either a first new navigation route 256 or a second new navigation route 258. It will be appreciated that any number of new navigation routes 256, 258 may be generated and/or communicated to a vehicle-for-hire's 270 navigation device in order to steer toward nodes 260 with a high predicted vehicle-for-hire demand and to avoid nodes 260 of low predicted vehicle-for-hire demand.

Figure 7:
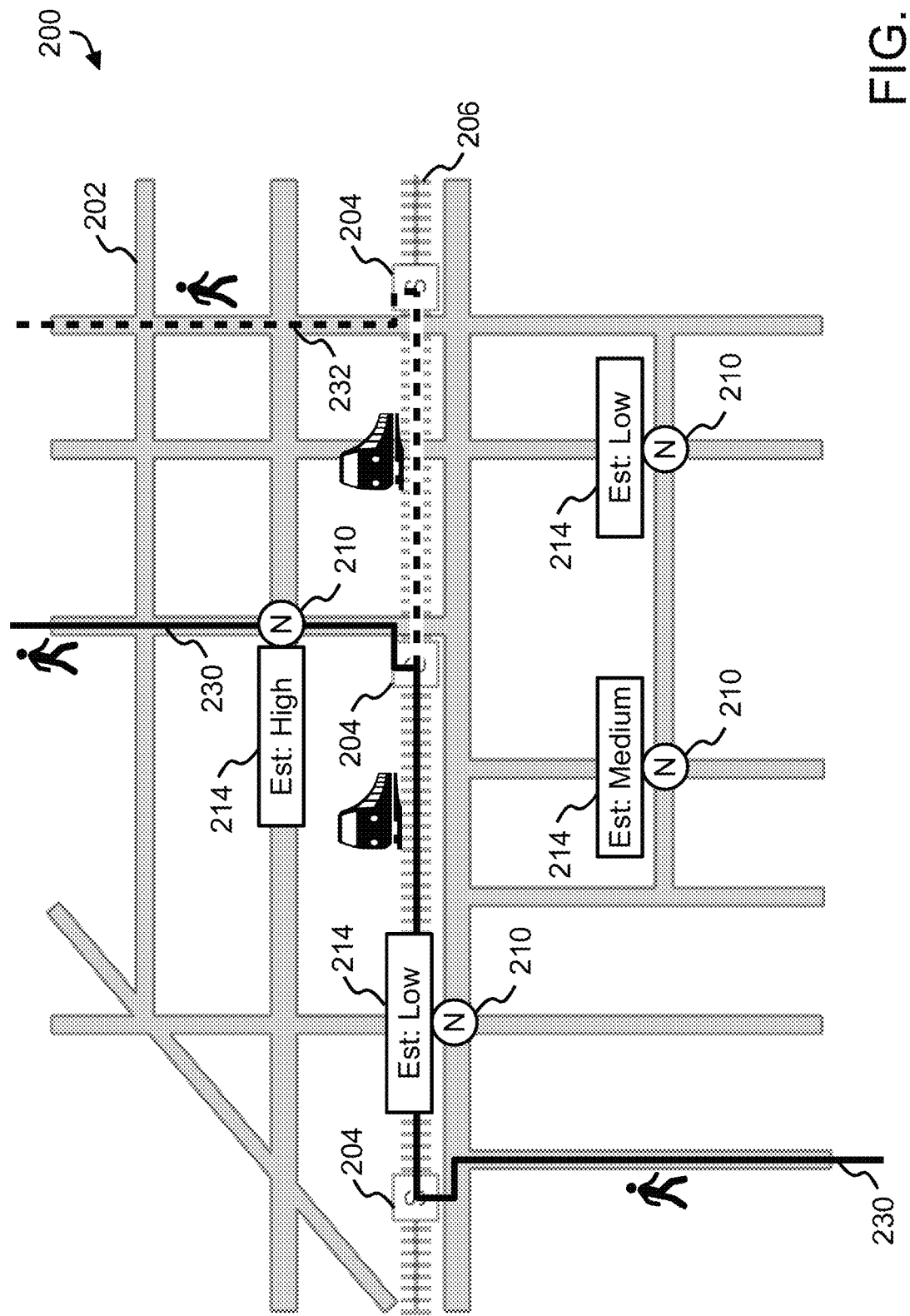
FIG. 7 is an illustrative diagram of one non-limiting embodiment or aspect of a system and method for machine-learning-based traffic prediction.

With specific reference to FIG. 7, and in non-limiting embodiments or aspects, provided is a further illustrative diagram of a system and method for machine-learning-based traffic prediction. In the depicted non-limiting embodiment, shown is an initial navigation route 230 from the lower-left of the region 200 to the upper-right of the region 200 that combines two modes of transportation, namely, pedestrian and railway transit. It will be appreciated that one or more modes of transportation may be combined and accounted for in the systems and methods described herein. In the example shown, the initial navigation route 230 is a pedestrian route that extends to a first railway station 204, proceeds to the next railway station 204, and resumes again by a pedestrian route to the top of the region 200. This initial navigation route 230 happens to pass through two geographic nodes of activity 210, but it will be appreciated that the steps described herein may also be applied to routes passing near or around geographic nodes of activity. In the depicted example, there is a node 210 with a high estimate of traffic intensity 214, which may meet or exceed an upper-bound threshold of traffic intensity for that node 210. In response, a routing and communication server may communicate with a navigation device of a traveler to modify the navigation route 230 to a new navigation route 232 that travels less proximal to the node 210 having a high estimate of traffic intensity 214. As shown in the example depicted, the new navigation route 232 instead proceeds to a third railway station 204 further to the right of the region 200 to avoid passing through the node 210 with a high estimate of traffic intensity 214. It will be appreciated that the same techniques may be applied to optimize a route that may or may not pass directly through nodes of activity, which may instead be modified to proceed closer to nodes 210 with less traffic and farther from nodes 210 with more traffic.

With specific reference to FIG. 8, and in non-limiting embodiments or aspects, provided is a method 300 for machine-learning-based traffic prediction. The method 300 may be executed by one or more servers, each including one or more computer processors. Data that is communicated with the one or more servers may be stored in one or more databases that are communicatively connected to the one or more servers. The method 300 includes, in step 302, receiving historic transaction data including a number of transactions by one or more consumers in a region. The term "historic transaction data" may include transaction data for transactions between consumers and merchants completed prior to and including up to the moment of traffic estimation for nodes in the region. In step 304, using a machine-learning classification model and based at least partially on the historic transaction data, a transportation categorization is generated for one or more consumers. The transportation categorization is representative of a mode of transportation to be taken by the corresponding consumer when the consumer travels to complete a transaction at a point-of-sale terminal in the region. Transportation categorization may include, but is not limited to: motor vehicle (e.g., personal vehicle, hired vehicle, taxi, etc.), train (e.g., light rail, subway, etc.), bus, ferry, pedestrian, bicycle, and/or the like. The transportation categorization may be generated by, in step 305, associating consumer transactions with modes of transportation. As described above, merchant business types and transaction types may be indicators of a mode of transportation a consumer may use.

With further reference to FIG. 8, and in further non-limiting embodiments, the method 300 includes, in step 306, receiving one or more messages associated with one or more transactions between consumers and POS terminals in the region. The message may include: an authorization request to be processed by a transaction service provider, an encrypted communication containing transaction data that is transmitted to a modeling server from a consumer device or a POS terminal, a transaction receipt forwarded from a consumer or a merchant, and/or the like. It will be appreciated that messages associated with transactions being completed may be embodied by many forms of communication. In a preferred, non-limiting embodiment, the messages are transaction authorization requests that are processed in real-time by a transaction processing server of a transaction service provider, as in step 307. In step 308, one or more geographic nodes of activity are identified in the region. A geographic node of activity may include one or more POS terminals, such as a cluster of POS terminals having the node as a centroid or point therein, or may correspond directly to a POS terminal, as in step 309. In step 310, one or more estimates of traffic intensity are generated for corresponding one or more geographic nodes of activity. An estimate of traffic intensity is representative of a predicted volume of traffic for a mode of transportation. As described above, an estimate of traffic intensity may be quantitative or qualitative such that it may be compared to a threshold traffic intensity. In step 312, one or more estimates of traffic intensity are compared to corresponding one or more thresholds of traffic intensity. A threshold of traffic intensity may be determined by the traffic capacity of the channel(s) of transit by which a traveler may travel to an associated geographic node of activity, as in step 313. A threshold of traffic intensity may be an upper bound, which when satisfied indicates a higher amount of traffic (indicating the node should be avoided), or a lower bound, which when satisfied indicates a lower amount of traffic (indicating the node need not be avoided, or may be actively sought to travel through).

With further reference to FIG. 8, and in further non-limiting embodiments, the method 300 includes, in step 314, in response to one or more estimates of traffic intensity satisfying corresponding one or more thresholds of traffic intensity, generating and communicating a communication to one or more navigation devices, the communication configured to cause one or more navigation devices to modify a navigation route through the region. A navigation route of a target navigation device may be modified to avoid traveling through or near nodes of higher estimates of traffic intensity and/or seek traveling through or near nodes of lower estimates of traffic intensity. Communications to navigation devices may be transmitted through any suitable communication network, or more particularly, through a network of localized communication devices in the region that are configured to communicate with each other and/or communication devices of travelers in the region, in step 315. Localized communication devices may be associated with one or more subregions, and subregions may be associated with one or more localized communication device.

Step 314, in which a communication is sent to a navigation device, may include or be parallel to a step of generating display data configured to cause the navigation device to the geographic node of activity as a point on a geographical map of the region, wherein a visual characteristic of the point represents the category of traffic intensity. The visual characteristic may be a shape, color, icon, movement, animation, brightness, and/or the like that is configured to convey a traffic intensity. For example, the navigation device may receive communication display data configured to show the node as a circular dot that is colored according to traffic intensity, where red indicates high traffic intensity, yellow indicates moderate traffic intensity, and green indicates low traffic intensity. Alternatively, nodes having estimates of traffic intensity surpassing an upper-bound threshold may be visually represented as a point with a warning icon, such as an exclamation mark. Furthermore, the navigation devices may be physically moving with travelers as the travelers are traveling through the region, or the navigation devices may be positioned remotely from the travelers and communicate the navigation route to the traveler via a separate traveler communication device.

With specific reference to FIG. 9, and in non-limiting embodiments or aspects, provided is a method 400 for generating real-time predictions for vehicle transportation requests using machine learning. The method 400 may be executed by one or more servers, each including one or more computer processors. Data that is communicated with the one or more servers may be stored in one or more databases that are communicatively connected to the one or more servers. The method 400 includes, in step 402, receiving historic transaction data including a number of transactions by one or more consumers in a region. In accordance with non-limiting embodiments or aspects, the term "historic transaction data" may include transaction data for transactions between consumers and merchants completed prior to and including up to the moment of predicted vehicle demand estimation for nodes in the region. In non-limiting embodiments, the historic transaction data may specifically include a subset of transactions for the consumer that involve transportation requests generally and/or for specific types of transportation (e.g., vehicles-for-hire). In step 404, using a machine-learning classification model and based at least partially on the historic transaction data, a transportation categorization is generated for one or more consumers. In accordance with this non-limiting embodiment or aspect, the transportation categorization may be representative of a likelihood that the corresponding consumer is to request a specified type of vehicle-for-hire (e.g., a ride-share vehicle, a taxi, a pedicab, a carriage, a rickshaw, a jitney, a rental car delivery service and/or the like) subsequent to (e.g., within an identified time interval after) completing a card-present transaction. The transportation categorization may be generated by, in step 405, associating consumer transactions with modes of transportation. As described above, merchant business types and transaction types may be indicators of a mode of transportation a consumer may be likely to utilize (e.g., a vehicle-for-hire) within an identified time interval (e.g., a time interval corresponding to a predicted travel time for the vehicle-for-hire to reach the geographic node of activity).

With further reference to FIG. 9, and in further non-limiting embodiments, the method 400 includes, in step 406, receiving one or more messages associated with one or more transactions between consumers and POS terminals in the region. The message may include: an authorization request to be processed by a transaction service provider, an encrypted communication containing transaction data that is transmitted to a modeling server from a consumer device or a POS terminal, a transaction receipt forwarded from a consumer or a merchant, and/or the like. It will be appreciated that messages associated with transactions being completed may be embodied by many forms of communication. In a preferred, non-limiting embodiment, the messages are transaction authorization requests that are processed in real-time by a transaction processing server of a transaction service provider, as in step 407. In step 408, one or more geographic nodes of activity are identified in the region. A geographic node of activity may include one or more POS terminals, such as a cluster of POS terminals having the node as a centroid or point therein, or may correspond directly to a POS terminal, as in step 409. In step 410, one or more estimates of vehicle-for-hire demand are generated and are identified as corresponding one or more geographic nodes of activity. An estimate of vehicle demand is representative of a predicted number of consumers who are likely to request a vehicle-for-hire during an identified time interval. As described above, an estimate of vehicle-for-hire demand may be quantitative, qualitative, and/or comparative such that it may be compared to a threshold vehicle demand and/or to the estimated vehicle demand of other geographic nodes in the region.

In step 412, one or more estimates of vehicle-for-hire demand are compared to corresponding one or more thresholds of vehicle-for-hire demand. A threshold of vehicle-for-hire demand may be determined by a predicted wait time a vehicle-for-hire located in the vicinity of the geographic node would experience before engaging a new customer. A threshold of vehicle demand may be a lower bound, which when exceeded, indicates a sufficiently high amount of vehicle-for-hire demand (indicating the node is a desirable location for a vehicle-for-hire to acquire new customers), or an high demand threshold, which when satisfied indicates an abnormally high degree of vehicle-for-hire demand (indicating the node should be actively traveled to in order to acquire new customers immediately). In step 413, one or more thresholds may be adjusted based on a transportation supply estimate for the geographic node representative of a number of vehicles-for-hire that are actively seeking to acquire customers in the vicinity of the geographic node. The transportation supply estimate may be determined by vehicle operator input data and/or navigation system (e.g., GPS) data from vehicles-for-hire in communication with the system. For example, a vehicle demand threshold may be increased by a predetermined amount for each vehicle-for-hire that is known or predicted to be actively seeking to acquire customers in the vicinity of the geographic node, such that a vehicle-for-hire is more likely directed away from geographic nodes where a large supply of vehicles-for-hire is already present and less likely to be directed toward geographic nodes where a smaller supply of vehicles-for-hire is present.

With further reference to FIG. 9, and in non-limiting embodiments or aspects, the method 400 includes, in step 414, in response to one or more estimates of vehicle-for-hire demand satisfying corresponding one or more thresholds of traffic intensity, generating and communicating a communication to one or more navigation devices, the communication configured to cause one or more navigation devices to modify a navigation route through the region or to automatically dispatch a vehicle-for-hire to a specified location in the region. A navigation route of a target navigation device may be modified to steer toward geographic nodes with higher estimates of traffic intensity and/or avoid geographic nodes having lower estimates of traffic intensity. Communications to navigation devices may be transmitted through any suitable communication network, or more particularly, through a network of localized communication devices in the region that are configured to communicate with each other and/or communication devices of travelers in the region, in step 415. Localized communication devices may be associated with one or more subregions, and subregions may be associated with one or more localized communication device.

Still referring to FIG. 9, step 414, in which a communication is sent to a navigation device, may include or be performed concurrently with a step of generating display data configured to cause the navigation device to the geographic node of activity as a point on a geographical map of the region, wherein a visual characteristic of the point represents the category of vehicle-for-hire demand level. The visual characteristic may be a shape, color, icon, movement, animation, brightness, and/or the like that is configured to convey a vehicle-for-hire demand level. For example, the navigation device may receive communication display data configured to show the node as a circular dot that is colored according to vehicle-for-hire demand level, where red indicates low vehicle-for-hire demand, yellow indicates moderate vehicle-for-hire demand, and green indicates high vehicle-for-hire demand. Alternatively, nodes having estimates of vehicle-for-hire demand surpassing an upper-bound threshold may be visually represented as a point with an icon indicating that the location is a particularly desirable place to acquire a new customer. Furthermore, the navigation devices may be physically moving with vehicles-for-hire as the vehicles-for-hire are traveling through the region, or the navigation devices may be positioned remotely from the vehicles-for-hire (e.g., at a central dispatch location) and communicate the navigation route to the vehicle-for-hire via a separate traveler communication device.

Although the disclosed system, method, and computer program product has been described in detail for the purpose of illustration based on what is currently considered to be the most practical and non-limiting embodiments, it is to be understood that such detail is solely for that purpose and that they are not limited to the disclosed embodiments but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method for generating real-time predictions for vehicle transportation requests using machine learning, comprising:
    generating, with at least one processor and a machine-learning classification model, a transportation categorization for each consumer of a plurality of consumers based at least partially on historic transaction data comprising a plurality of transactions by each of the plurality of consumers, each plurality of transactions for each consumer including a subset of transactions for vehicle transportation;
    processing, with at least one processor, a plurality of new transactions by each consumer of the plurality of consumers, each new transaction of the plurality of new transactions associated with at least one geographic node of activity;
    in response to processing the plurality of new transactions, generating, with at least one processor and the machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and
    generating, with at least one processor, a supply map interface comprising at least one visual identification of at least one location in which a number of requests for vehicle transportation is predicted to increase based on the plurality of vehicle transportation predictions.

2. The computer-implemented method of claim 1, wherein generating the transportation categorization for each consumer is based at least partially on a transaction type.

3. The computer-implemented method of claim 2, wherein the transaction type is determined based on at least one of the following: a merchant category, a merchant identity, a transaction amount, a transaction frequency, or any combination thereof.

4. The computer-implemented method of claim 1, wherein generating the transportation categorization for each consumer is based at least partially on condition data for the plurality of transactions, the condition data comprising at least one of the following: a time of day, a day of the week, a day of the year, a weather condition, a proximity to a specified location, a proximity to a specified event, or any combination thereof.

5. The computer-implemented method of claim 1, further comprising automatically dispatching, with at least one processor, at least one vehicle to the at least one location.

6. The computer-implemented method of claim 1, wherein the geographic node of activity corresponds to a location of at least one point-of-sale terminal.

7. The computer-implemented method of claim 1, further comprising:
    receiving, by at least one processor, location data associated with a geographic location of at least one vehicle-for-hire; and
    associating, by at least one processor, the geographic location of the at least one vehicle-for-hire with at least one geographic node of activity based on a proximity of the vehicle-for-hire to the at least one geographic node of activity,
    wherein the at least one visual identification of the at least one location in which a number of requests for vehicle transportation is predicted to increase is further generated based on a number of vehicles-for-hire that is associated with the at least one geographic node of activity corresponding to the at least one location.

8. A system for generating real-time predictions for vehicle transportation requests using machine learning, comprising at least one processor programmed and/or configured to:

generate, with a machine-learning classification model, a transportation categorization for each consumer of a plurality of consumers based at least partially on historic transaction data comprising a plurality of transactions by each of the plurality of consumers, each plurality of transactions for each consumer including a subset of transactions for vehicle transportation;

process a plurality of new transactions by each consumer of the plurality of consumers, each new transaction of the plurality of new transactions associated with at least one geographic node of activity;

in response to processing the plurality of new transactions, generate, with the machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and generate a supply map interface comprising at least one visual identification of at least one location in which a number of requests for vehicle transportation is predicted to increase based on the plurality of vehicle transportation predictions.

9. The system of claim 8, wherein the at least one processor is programmed and/or configured to generate the transportation categorization for each consumer based at least partially on a transaction type.

10. The system of claim 9, wherein the at least one processor is programmed and/or configured to determine the transaction type based on at least one of the following: a merchant category, a merchant identity, a transaction amount, a transaction frequency, or any combination thereof.

11. The system of claim 8, wherein the at least one processor is programmed and/or configured to generate the transportation categorization for each consumer is based at least partially on condition data for the plurality of transactions, the condition data comprising at least one of the following: a time of day, a day of the week, a day of the year, a weather condition, a proximity to a specified location, a proximity to a specified event, or any combination thereof.

12. The system of claim 8, wherein the at least one processor is further programmed and/or configured to automatically dispatch at least one vehicle to the at least one location.

13. The system of claim 8, wherein the geographic node of activity corresponds to a location of at least one point-of-sale terminal.

14. The system of claim 8, wherein the at least one processor is further programmed and/or configured to:
receive location data associated with a geographic location of at least one vehicle-for-hire; and
associate the geographic location of the at least one vehicle-for-hire with at least one geographic node of activity based on a proximity of the vehicle-for-hire to the at least one geographic node of activity,
wherein the at least one visual identification of the at least one location in which a number of requests for vehicle transportation is predicted to increase is further generated based on a number of vehicles-for-hire that is associated with the at least one geographic node of activity corresponding to the at least one location.

15. A computer program product for generating real-time predictions for vehicle transportation requests using machine learning, comprising at least one non-transitory computer-readable medium including program instructions, which, when executed by at least one processor, cause the at least one processor to:
generate, with a machine-learning classification model, a transportation categorization for each consumer of a plurality of consumers based at least partially on historic transaction data comprising a plurality of transactions by each of the plurality of consumers, each plurality of transactions for each consumer including a subset of transactions for vehicle transportation;
process a plurality of new transactions by each consumer of the plurality of consumers, each new transaction of the plurality of new transactions associated with at least one geographic node of activity;
in response to processing the plurality of new transactions, generate, with the machine-learning classification model, a plurality of vehicle transportation predictions for the plurality of consumers, each vehicle transportation prediction based on the transportation categorization for each consumer and a geographic node of activity associated with a new transaction, each vehicle transportation prediction representing a likelihood that the consumer will request vehicle transportation subsequent to conducting the new transaction; and
generate a supply map interface comprising at least one visual identification of at least one location in which a number of requests for vehicle transportation is predicted to increase based on the plurality of vehicle transportation predictions.

16. The computer program product of claim 15, further comprising instructions, which, when executed by at least one processor, cause the at least one processor to:
generate the transportation categorization for each consumer based at least partially on a transaction type,
wherein the transaction type is determined based on at least one of the following: a merchant category, a merchant identity, a transaction amount, a transaction frequency, or any combination thereof.

17. The computer program product of claim 15, further comprising instructions, which, when executed by at least one processor, cause the at least one processor to:
generate the transportation categorization for each consumer is based at least partially on condition data for the plurality of transactions, the condition data comprising at least one of the following: a time of day, a day of the week, a day of the year, a weather condition, a proximity to a specified location, a proximity to a specified event, or any combination thereof.

18. The computer program product of claim 15, further comprising instructions, which, when executed by at least one processor, cause the at least one processor to automatically dispatch at least one vehicle to the at least one location.

19. The computer program product of claim 15, wherein the geographic node of activity corresponds to a location of at least one point-of-sale terminal.

20. The computer program product of claim 15, further comprising instructions, which, when executed by at least one processer, cause the at least one processor to:
receive location data associated with a geographic location of at least one vehicle-for-hire; and
associate the geographic location of the at least one vehicle-for-hire with at least one geographic node of activity based on a proximity of the vehicle-for-hire to the at least one geographic node of activity,
wherein the at least one visual identification of the at least one location in which a number of requests for vehicle transportation is predicted to increase is further generated based on a number of vehicles-for-hire that is associated with the at least one geographic node of activity corresponding to the at least one location.

* * * * *